United States Patent
Hwang et al.

(10) Patent No.: US 12,207,107 B2
(45) Date of Patent: Jan. 21, 2025

(54) METHOD FOR PROCESSING NODE FAILURE IN INTEGRATED ACCESS AND BACKHAUL SYSTEM AND METHOD FOR TRANSMITTING REDIRECTION INFORMATION THEREIN

(71) Applicant: Samsung Electronics Co., Ltd., Suwon-si (KR)

(72) Inventors: June Hwang, Suwon-si (KR); Soenghun Kim, Suwon-si (KR); Beomsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 17/280,171

(22) PCT Filed: Sep. 27, 2019

(86) PCT No.: PCT/KR2019/012624
§ 371 (c)(1),
(2) Date: Mar. 25, 2021

(87) PCT Pub. No.: WO2020/067791
PCT Pub. Date: Apr. 2, 2020

(65) Prior Publication Data
US 2022/0007212 A1  Jan. 6, 2022

(30) Foreign Application Priority Data

Sep. 27, 2018 (KR) .................. 10-2018-0115256
Jan. 31, 2019 (KR) .................. 10-2019-0013032
(Continued)

(51) Int. Cl.
H04W 24/04 (2009.01)
H04W 76/18 (2018.01)
H04W 76/38 (2018.01)
(Continued)

(52) U.S. Cl.
CPC .......... *H04W 24/04* (2013.01); *H04W 76/18* (2018.02); *H04W 76/38* (2018.02)

(58) Field of Classification Search
CPC ..... H04W 24/04; H04W 76/18; H04W 76/38; H04W 76/36; H04W 76/19; H04W 48/12; H04W 84/047; H04W 92/14; H04W 92/18
See application file for complete search history.

(56) References Cited

U.S. PATENT DOCUMENTS 9,628,377 B2  4/2017  Kafle et al.
2009/0029645 A1  1/2009  Leroudier
(Continued)

FOREIGN PATENT DOCUMENTS

WO   2014/132286 A1   9/2014
WO   WO-2018182286 A1 * 10/2018 ............ H04W 36/03

OTHER PUBLICATIONS

3GPP 38.874 Study on Integrated Access and Backhaul, v0.5.0, Sep. 26, 2018 (Year: 2018).*
(Continued)

*Primary Examiner* — Ayaz R Sheikh
*Assistant Examiner* — David Zhijun Sun

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

15 Claims, 22 Drawing Sheets

(30) Foreign Application Priority Data

Apr. 9, 2019 (KR) ........................ 10-2019-0041474
Aug. 14, 2019 (KR) ........................ 10-2019-0099857

(56) References Cited

U.S. PATENT DOCUMENTS

| | | | |
|---|---|---|---|
| 2015/0304904 A1* | 10/2015 | Li ........................ | H04W 76/19 |
| | | | 455/436 |
| 2016/0014020 A1 | 1/2016 | Kafle et al. | |
| 2017/0006499 A1 | 1/2017 | Hampel et al. | |
| 2020/0169887 A1* | 5/2020 | Wager ................... | H04W 76/27 |
| 2021/0204348 A1* | 7/2021 | Chen ..................... | H04W 76/27 |
| 2021/0306904 A1* | 9/2021 | Narasimha ........ | H04W 28/0278 |
| 2022/0038164 A1* | 2/2022 | Wei ....................... | H04W 88/14 |
| 2022/0039188 A1* | 2/2022 | Ishii ..................... | H04W 24/04 |

OTHER PUBLICATIONS

"3rd Generation Partnership Project; Technical Specification Group Radio Access Network; Study on Integrated Access and Backhaul; (Release 15)", 3GPP TR 38.874 V0.5.0 (Oct. 2018), 76 pages.

AT&T, "Iab node discovery and route management procedures", 3GPP TSG-RAN WG2 Meeting #102, May 21-25, 2018, R2-1808040, 6 pages.

"3rd Generation Partnership Project; Technical Specification Group Radio Access Network; NG-RAN; Architecture description (Release 15)", 3GPP TS 38.401 V15.3.0 (Sep. 2018), 39 pages.

"3rd Generation Partnership Project; Technical Specification Group Radio Access Network; NR; NR and NG-RAN Overall Description; Stage 2 (Release 16)", 3GPP TS 38.300 V16.1.0 (Mar. 2020), 133 pages.

"3rd Generation Partnership Project; Technical Specification Group Radio Access Network; NR; Backhaul Adaptation Protocol (BAP) specification (Release 16)", 3GPP TS 38.340 V16.1.0 (Jul. 2020), 22 pages.

"3rd Generation Partnership Project; Technical Specification Group Radio Access Network; NR; Radio Resource Control (RRC) protocol specification (Release 16)", 3GPP TS 38.331 V16.1.0 (Jul. 2020), 906 pages.

International Search Report dated Jan. 10, 2020 in connection with International Patent Application No. PCT/KR2019/012624, 3 pages.

Written Opinion of the International Searching Authority dated Jan. 10, 2020 in connection with International Patent Application No. PCT/KR2019/012624, 6 pages.

"3rd Generation Partnership Project; Technical Specification Group Radio Access Network; NR; Study on Integrated Access and Backhaul; (Release 16)", 3GPP TR 38.874 V16.0.0 (Dec. 2018), 111 pages.

CATT, "Summary of the email discussion [106#43][IAB] Backhaul RLF", 3GPP TSG-RAN WG2 Meeting #107, Aug. 26-30, 2019, R21911431, 55 pages.

Huawei, HiSilicon, "Physical layer design for NR IAB", 3GPP TSG RAN WG1 Meeting #94, Aug. 20-24, 2018, R1-1808101, 14 pages.

Intel Corporation, "PHY layer enhancements for NR IAB", 3GPP TSG RAN WG1 #94, Aug. 20-24, 2018, R1-1808691, 13 pages.

Supplementary European Search Report dated Apr. 28, 2022 in connection with European Patent Application No. 19 86 5117, 9 pages.

Intellectual Property India, "Examination Report under sections 12& 13 of the patents act," dated Sep. 15, 2022 in connection with Indian Patent Application No. 202137012986, 6 pages.

Office Action issued Dec. 14, 2023, in connection with Chinese Patent Application No. 201980063558.5, 31 pages.

\* cited by examiner

[Fig. 1A]
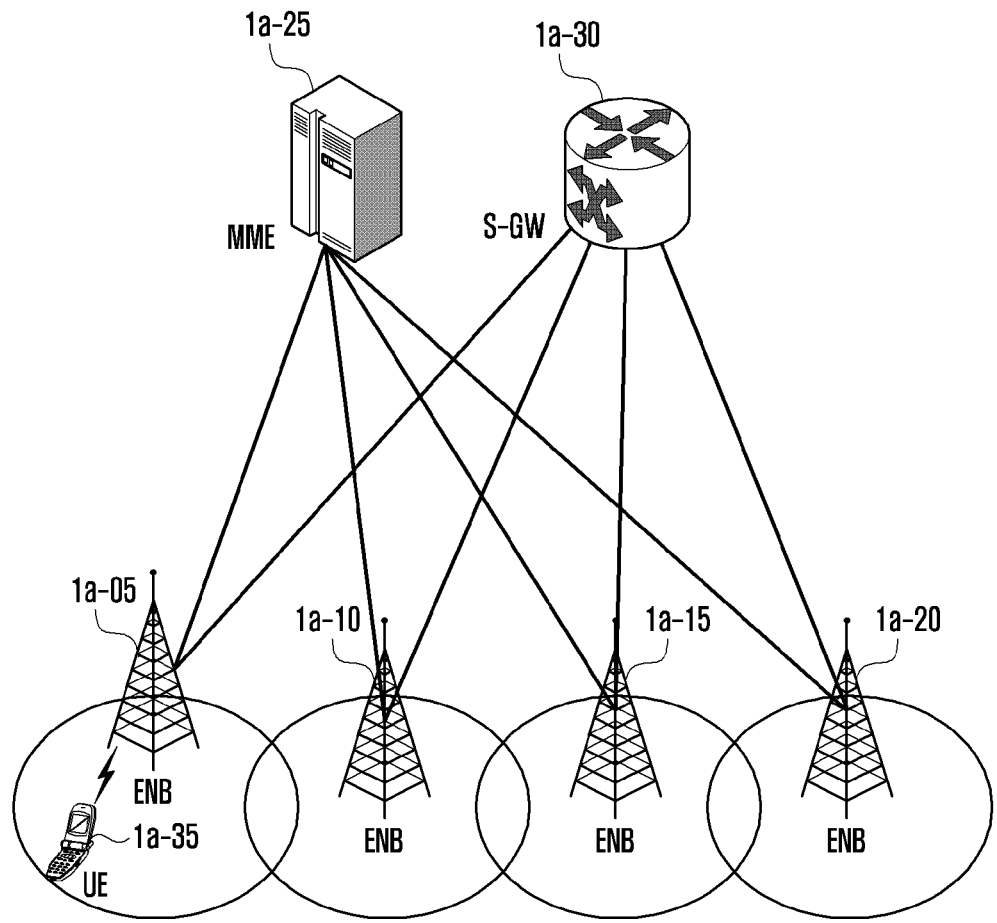
[Fig. 1B]
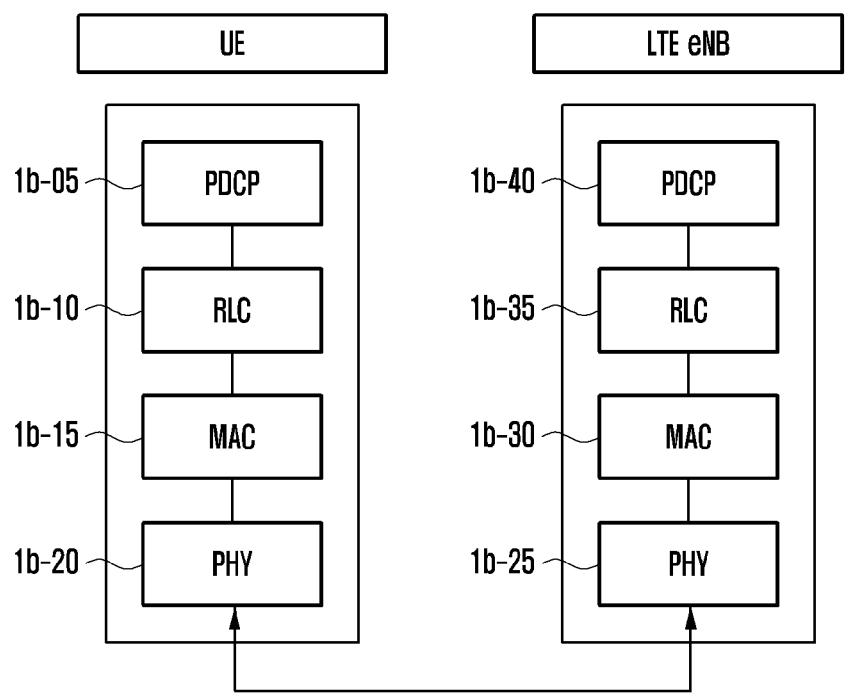

[Fig. 1C]
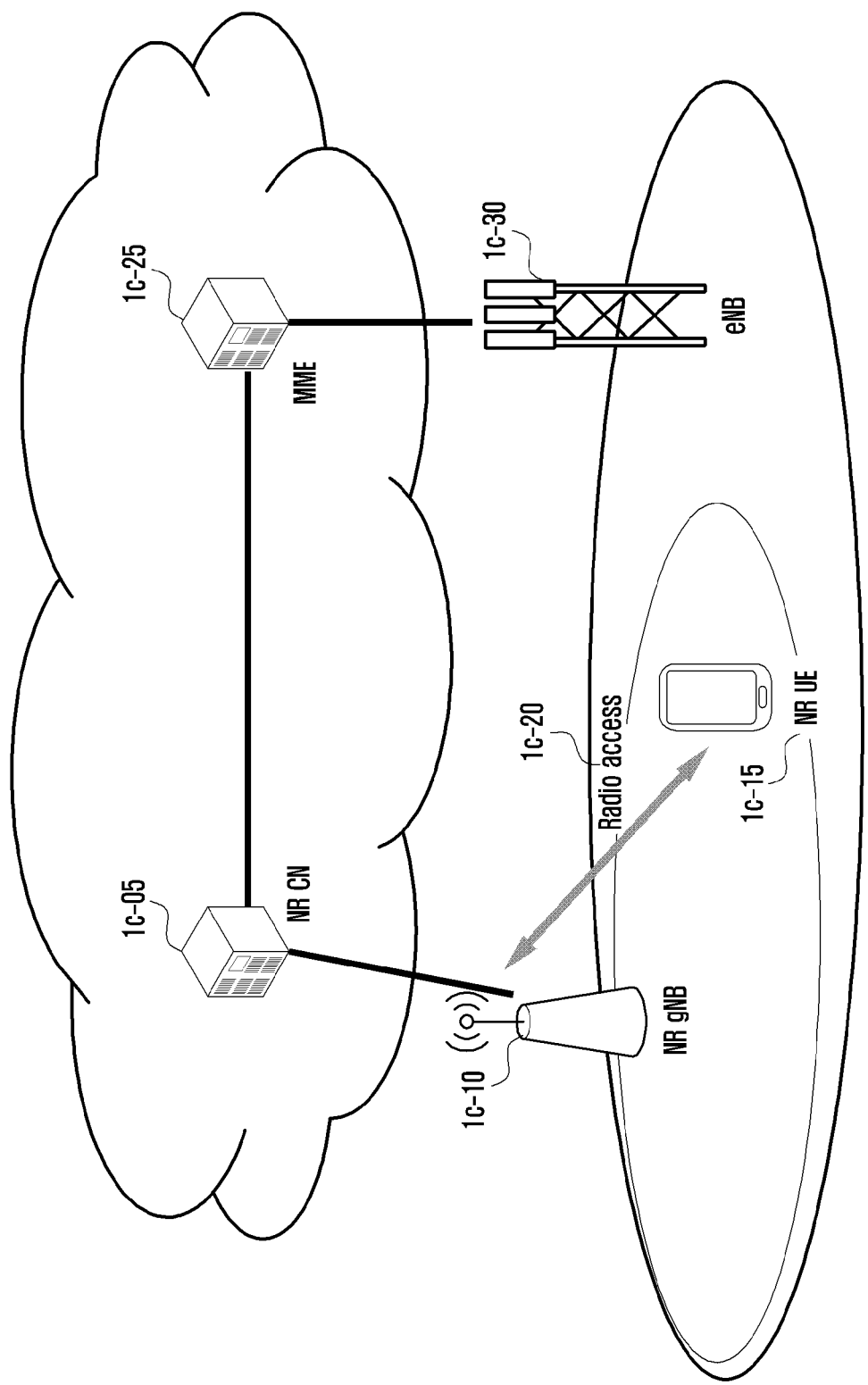

[Fig. 1D]
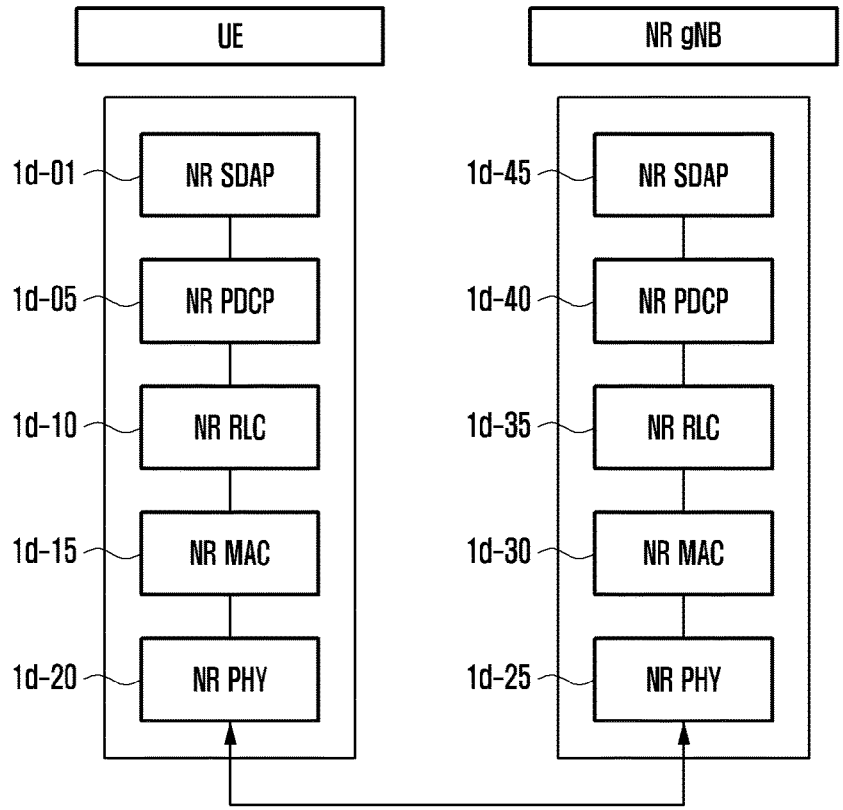
[Fig. 1E]
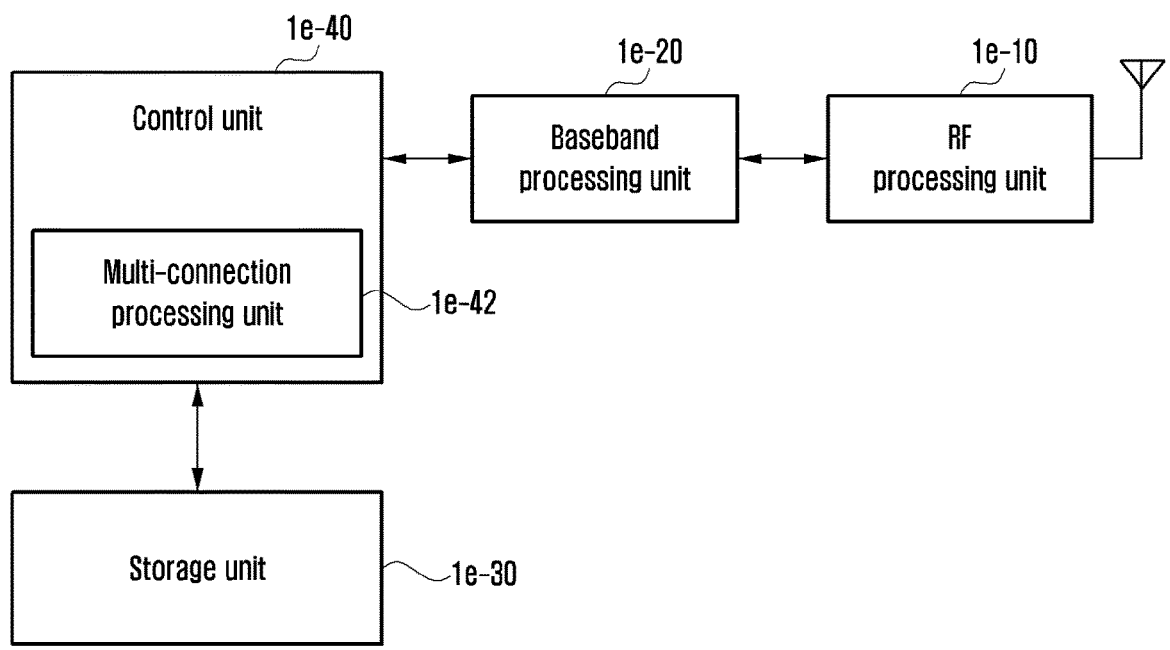

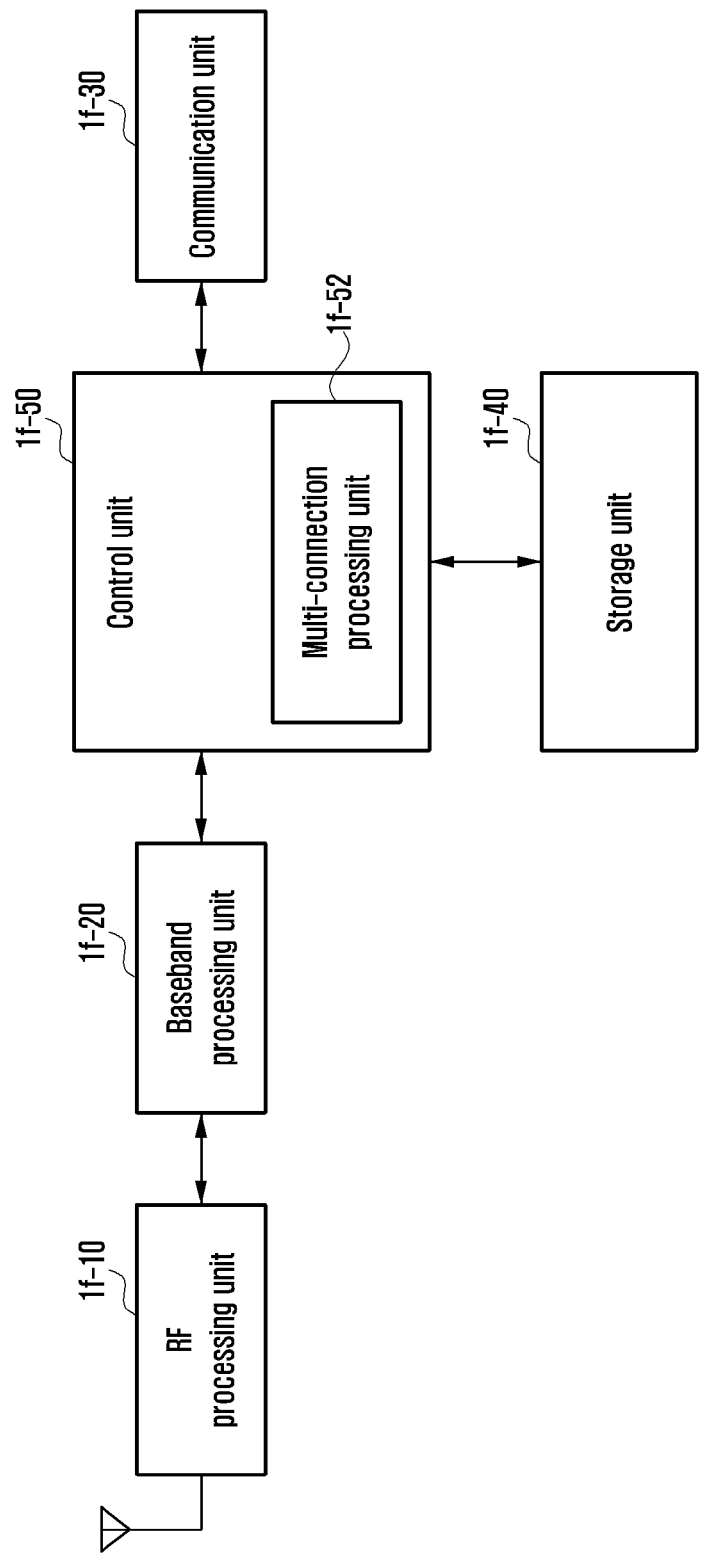
[Fig. 1F]

[Fig. 1G]
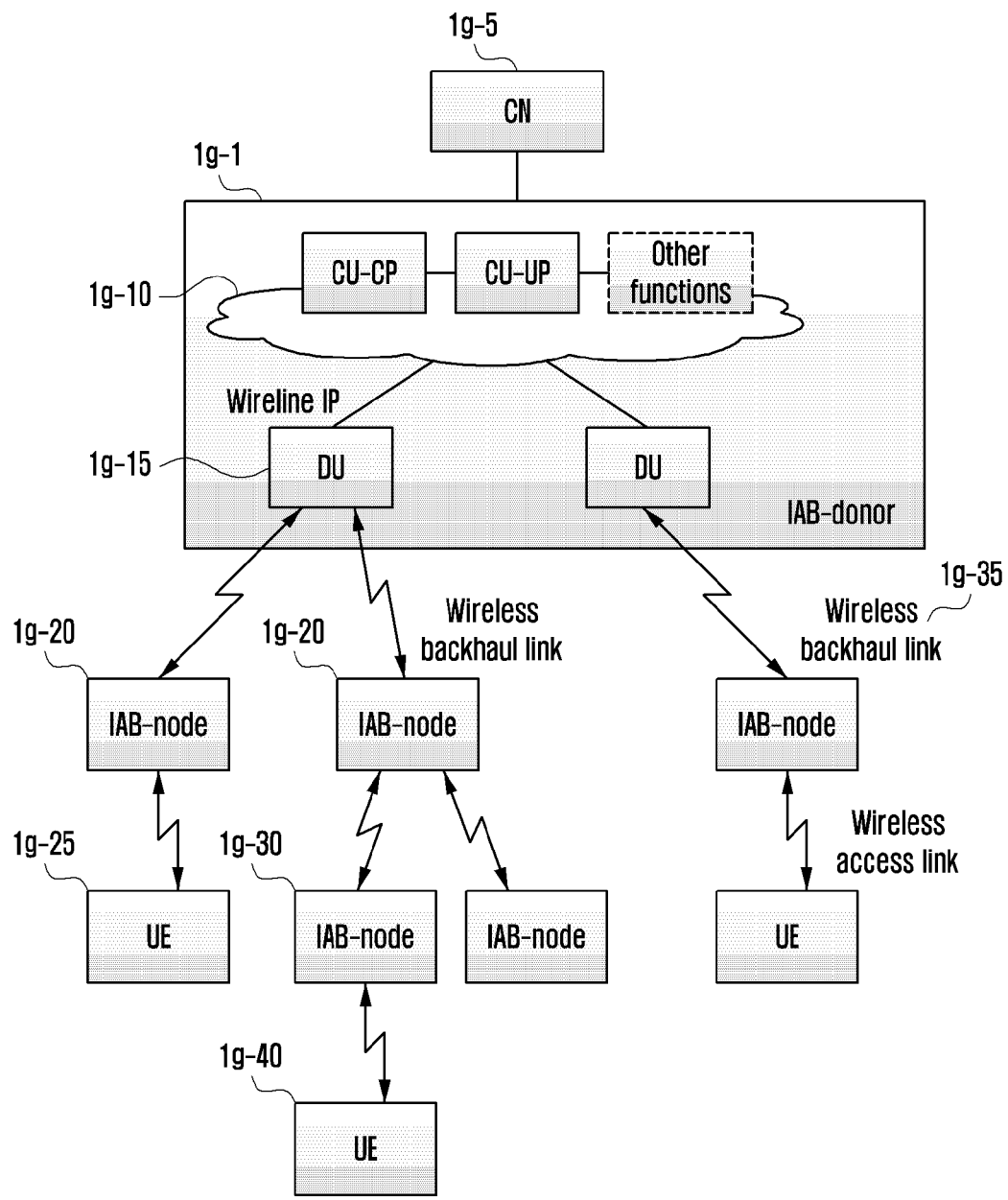

[Fig. 1H]
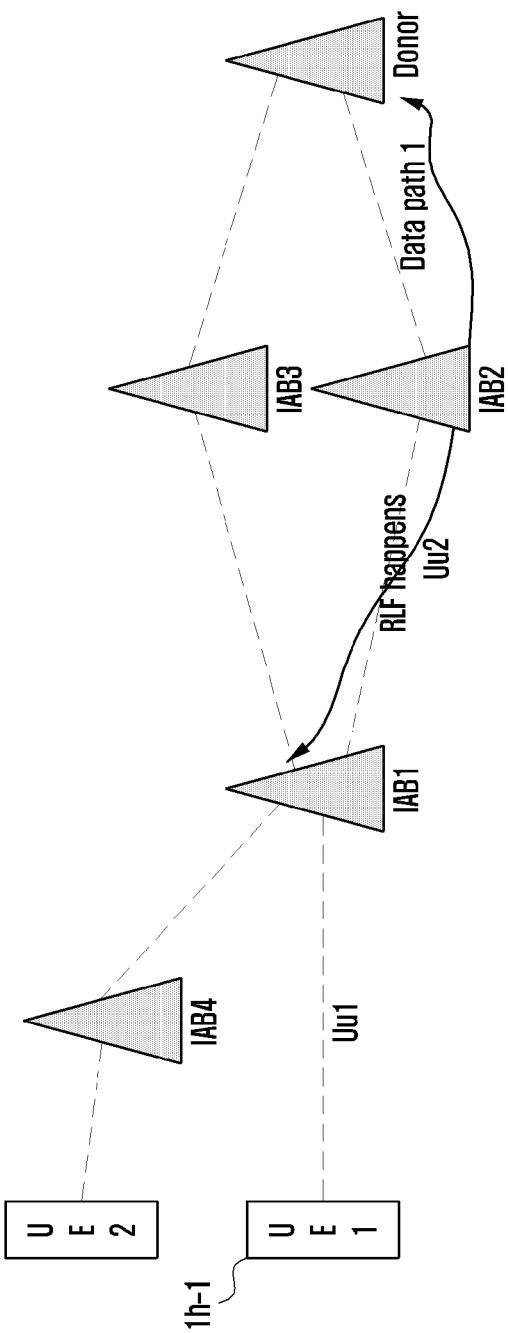

[Fig. 1I]
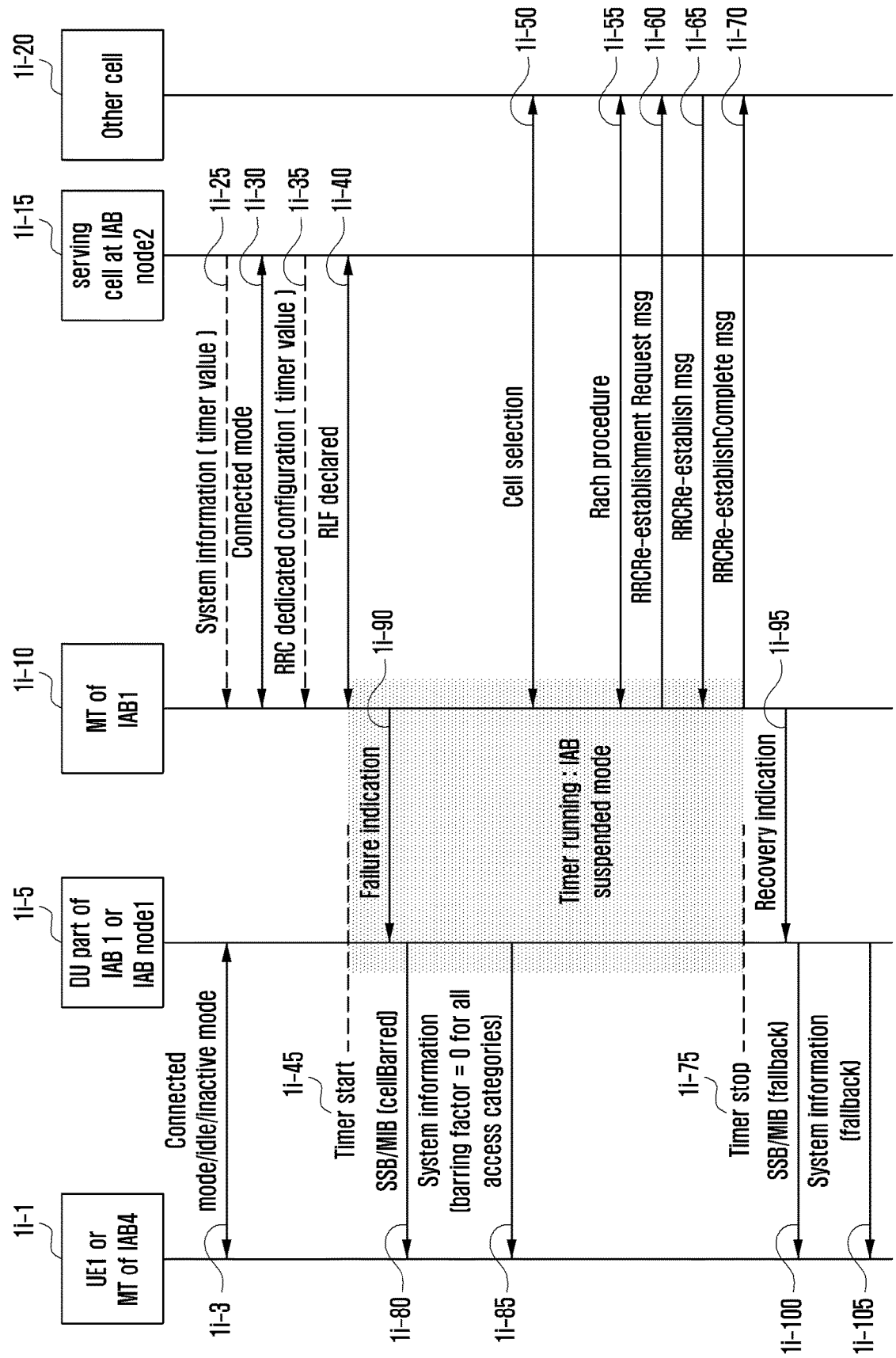

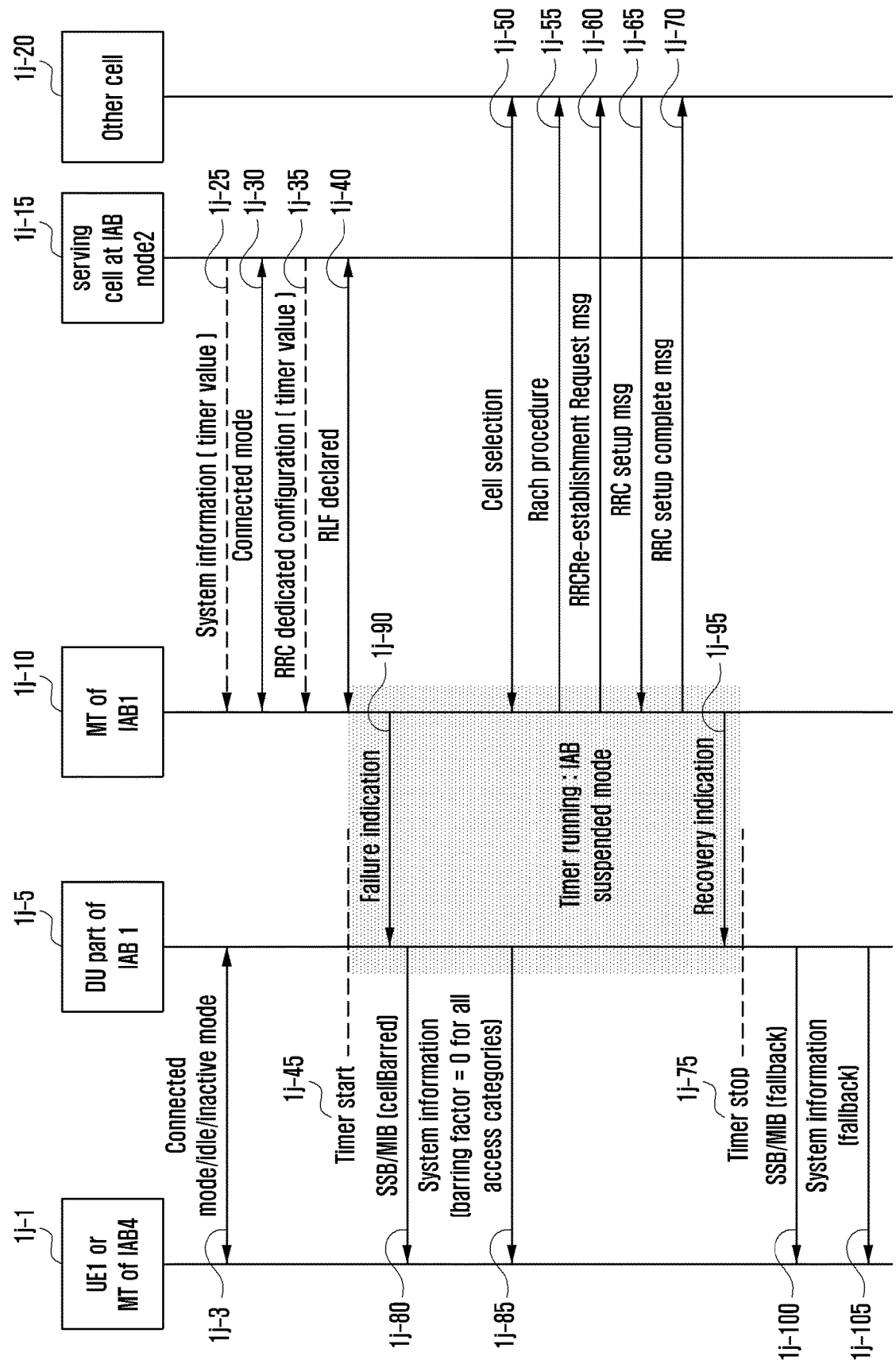
[Fig. 1J]

[Fig. 1K]
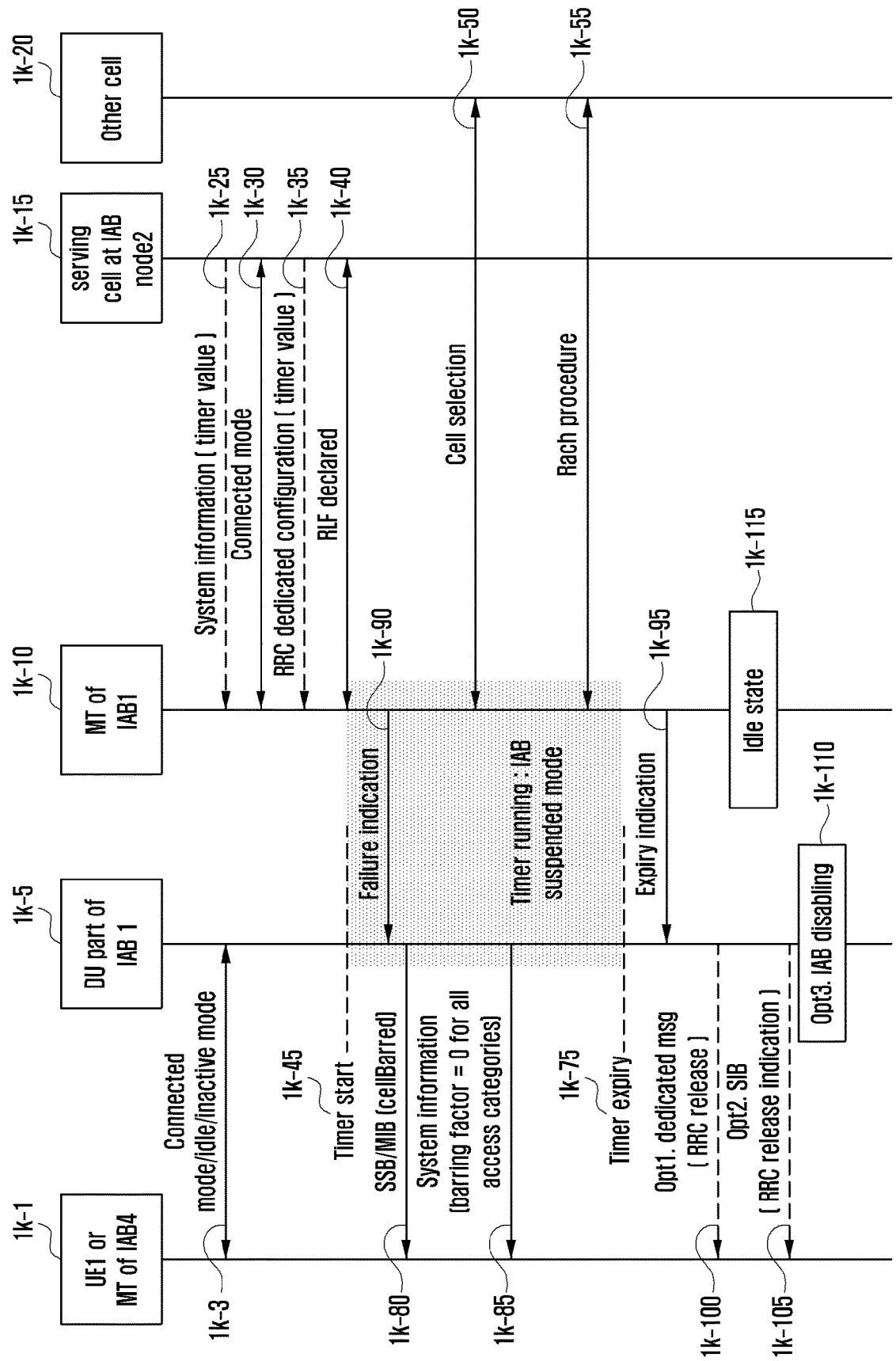

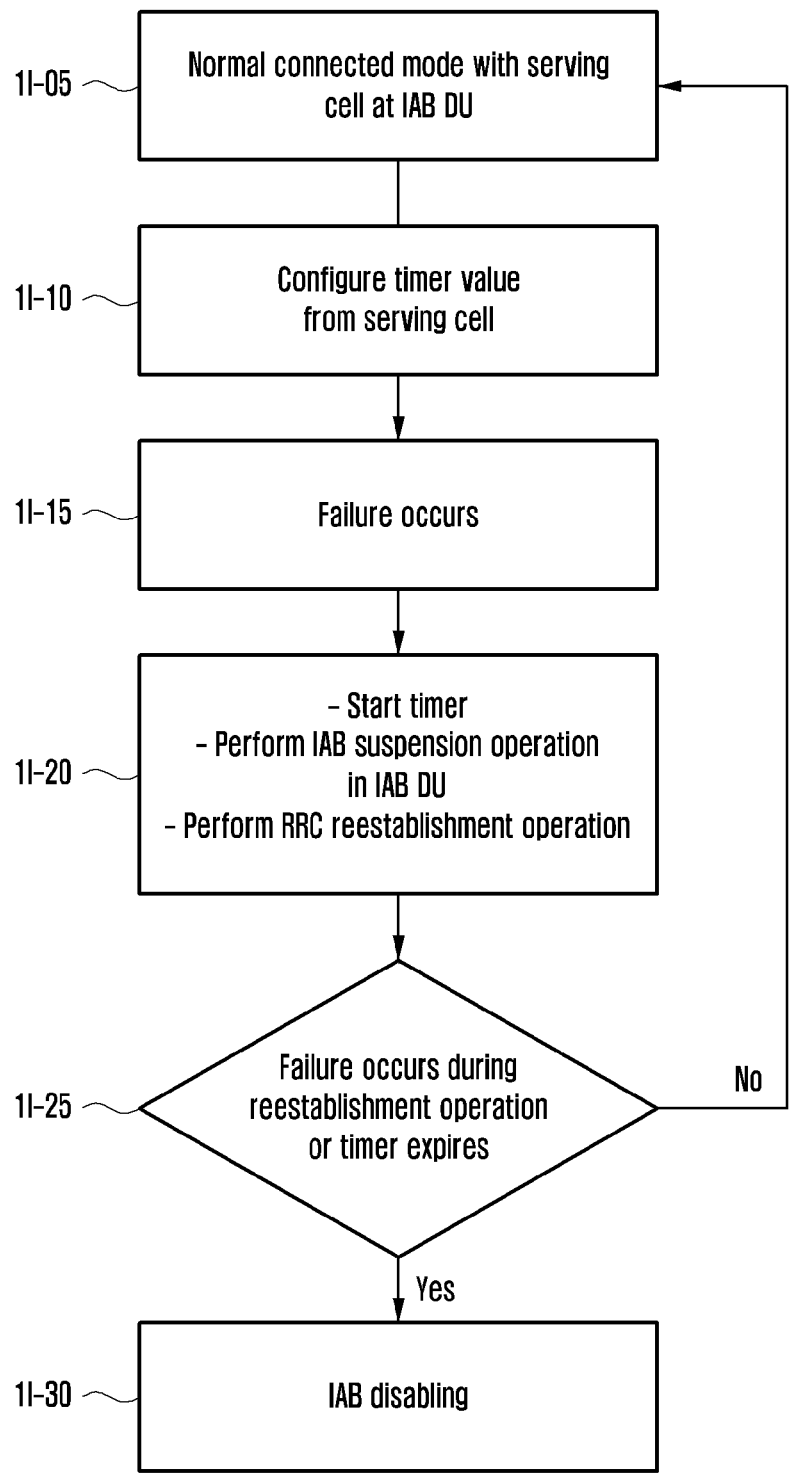
[Fig. 1L]

[Fig. 1M]
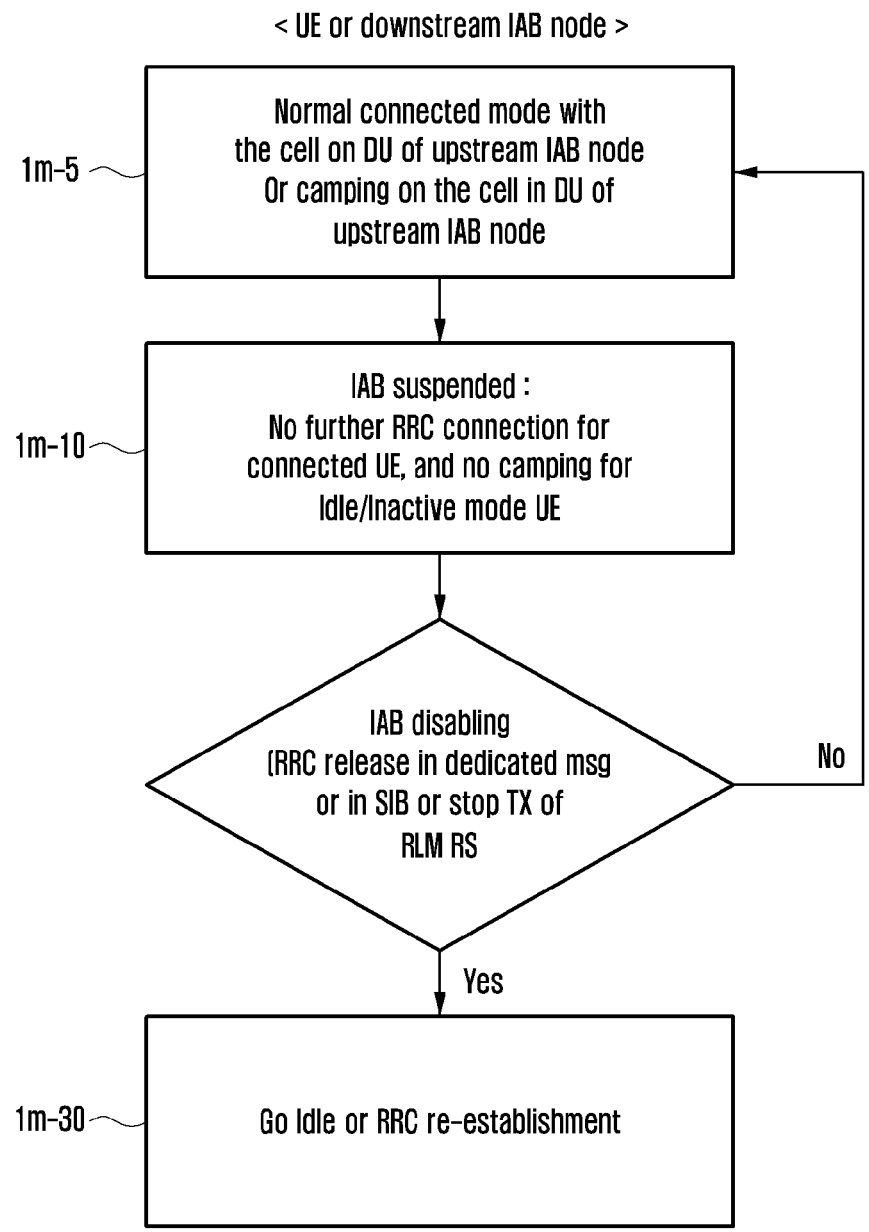

[Fig. 2A]
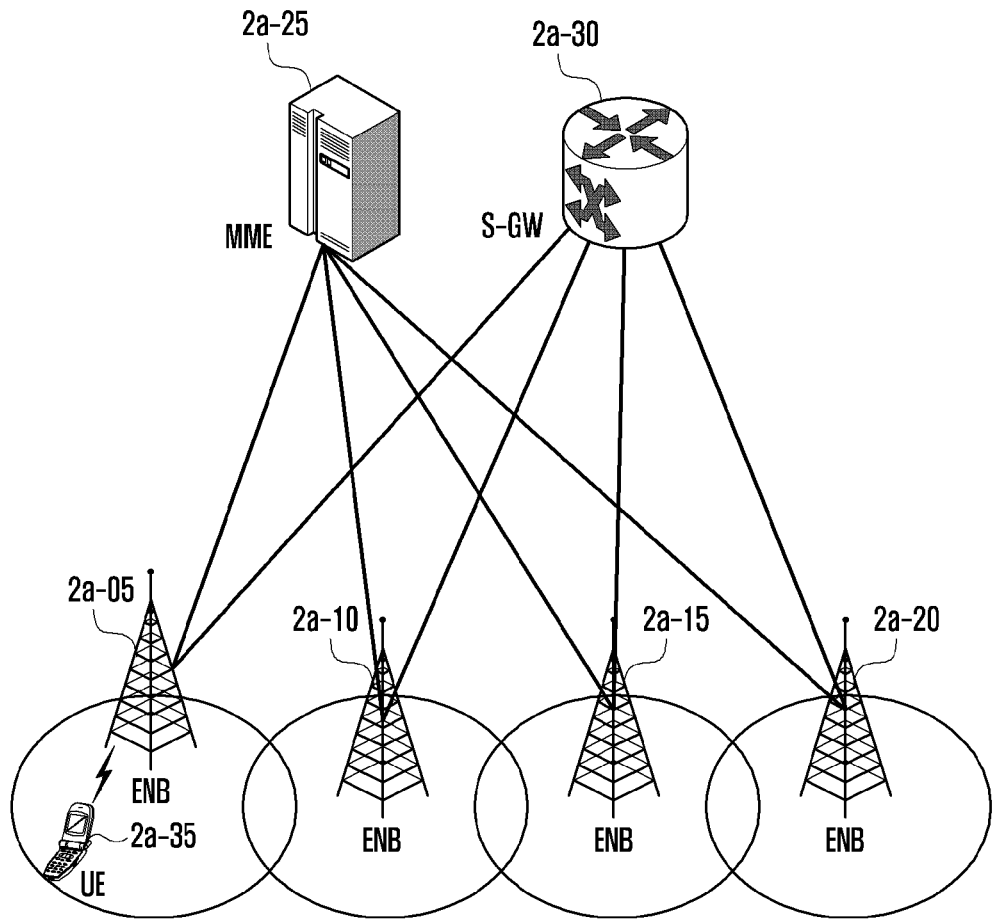
[Fig. 2B]
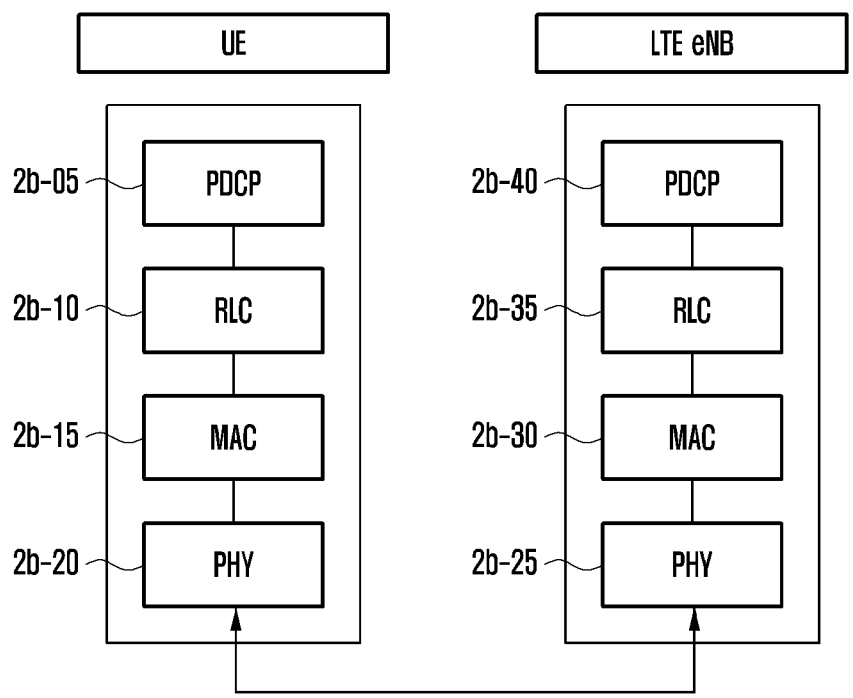

[Fig. 2C]
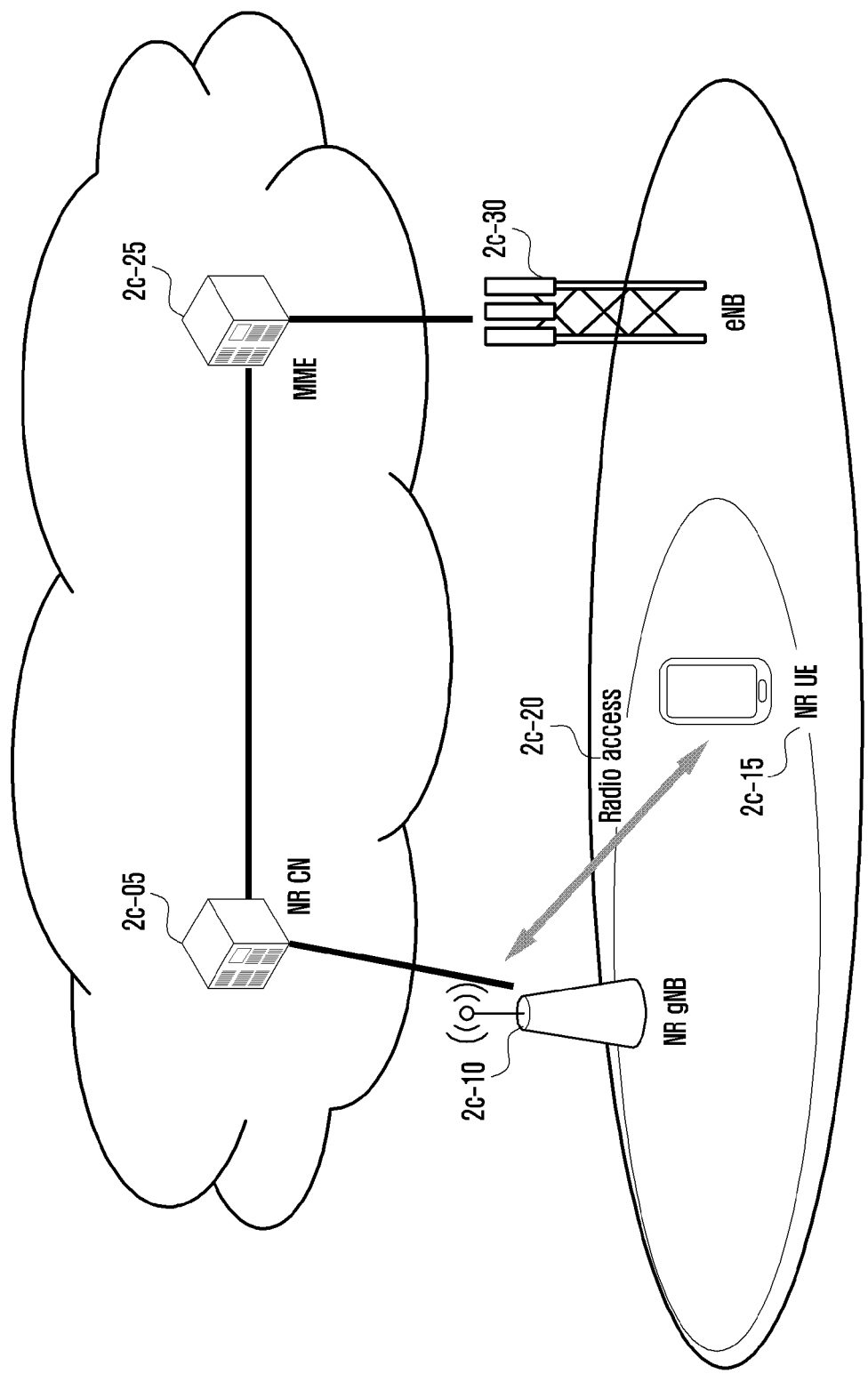

[Fig. 2D]
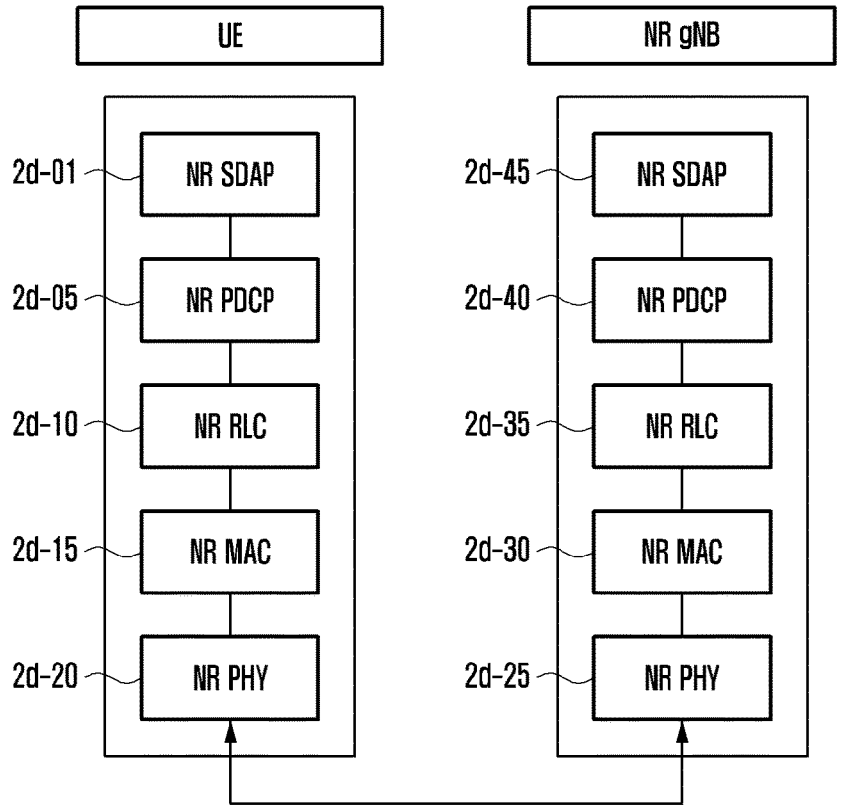
[Fig. 2E]
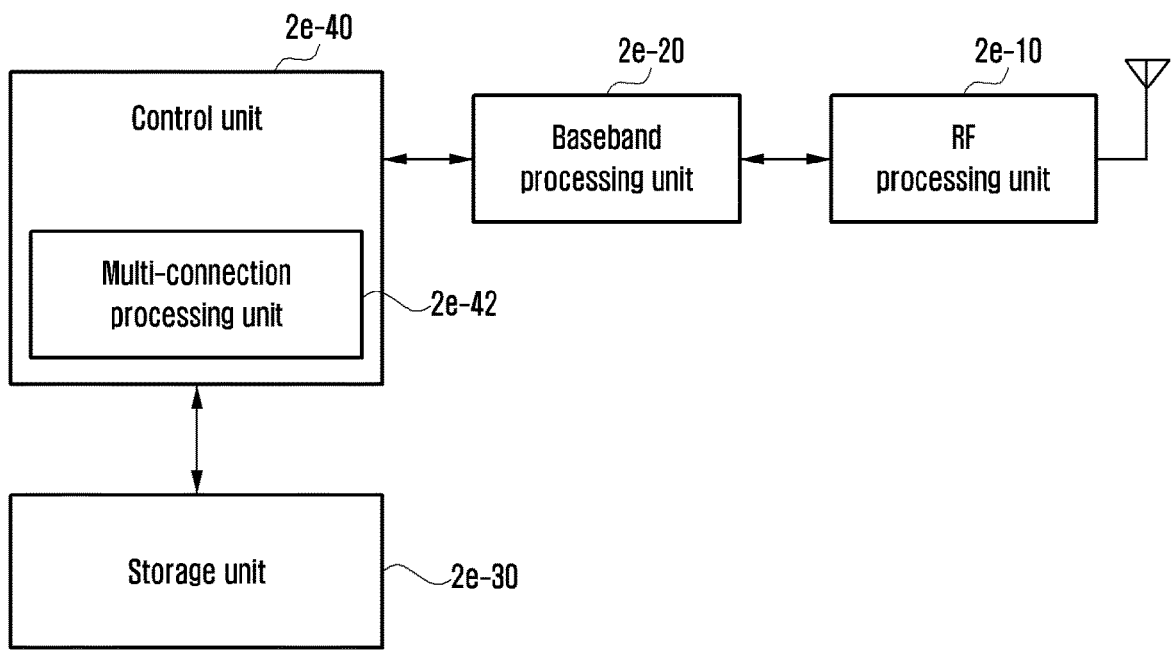

[Fig. 2F]
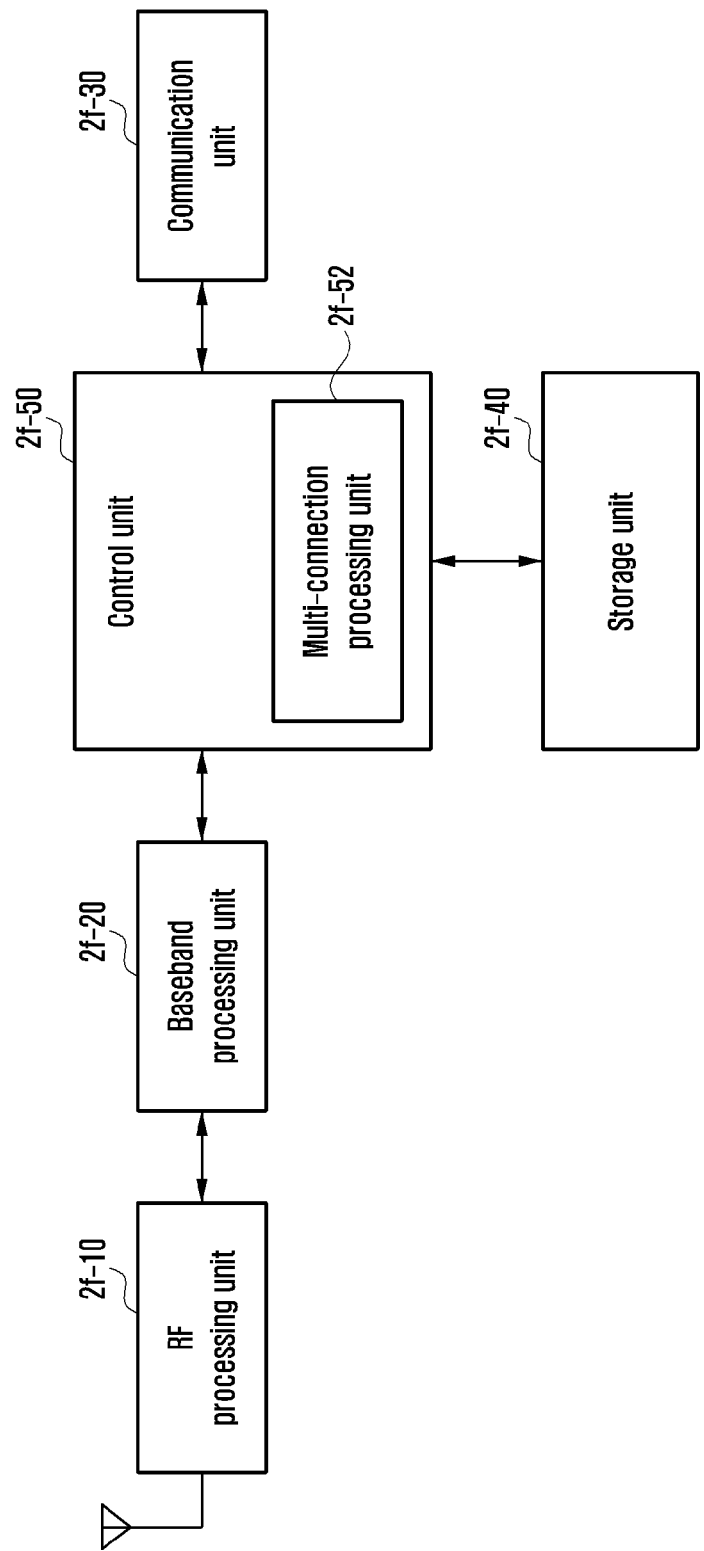

[Fig. 2G]
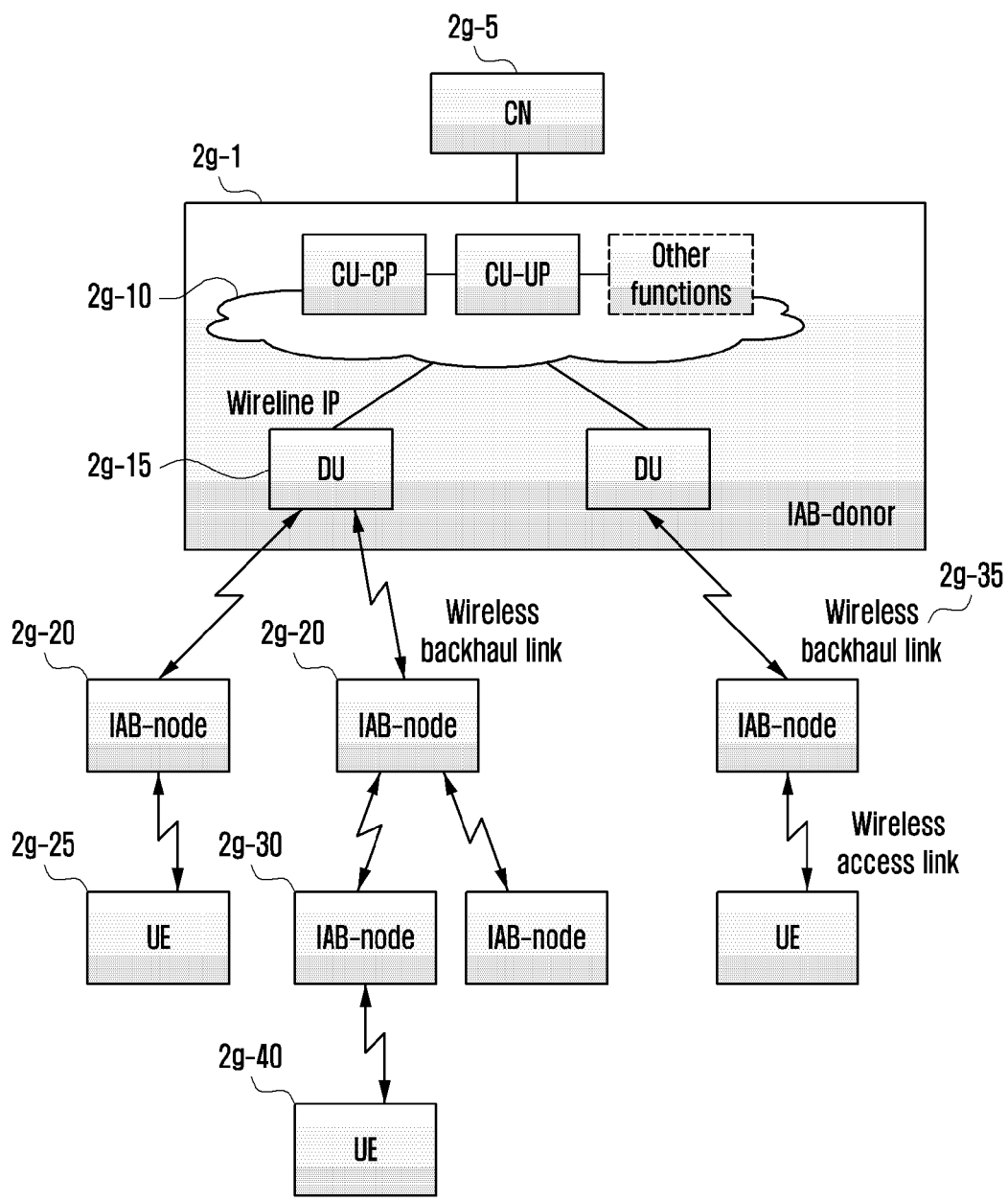

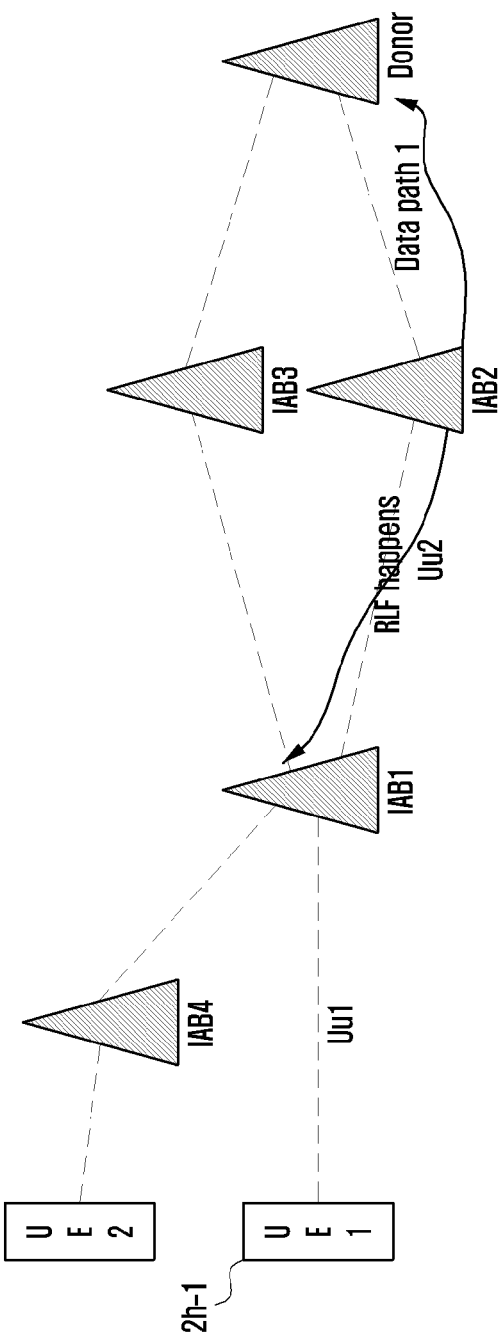
[Fig. 2H]

[Fig. 2I]
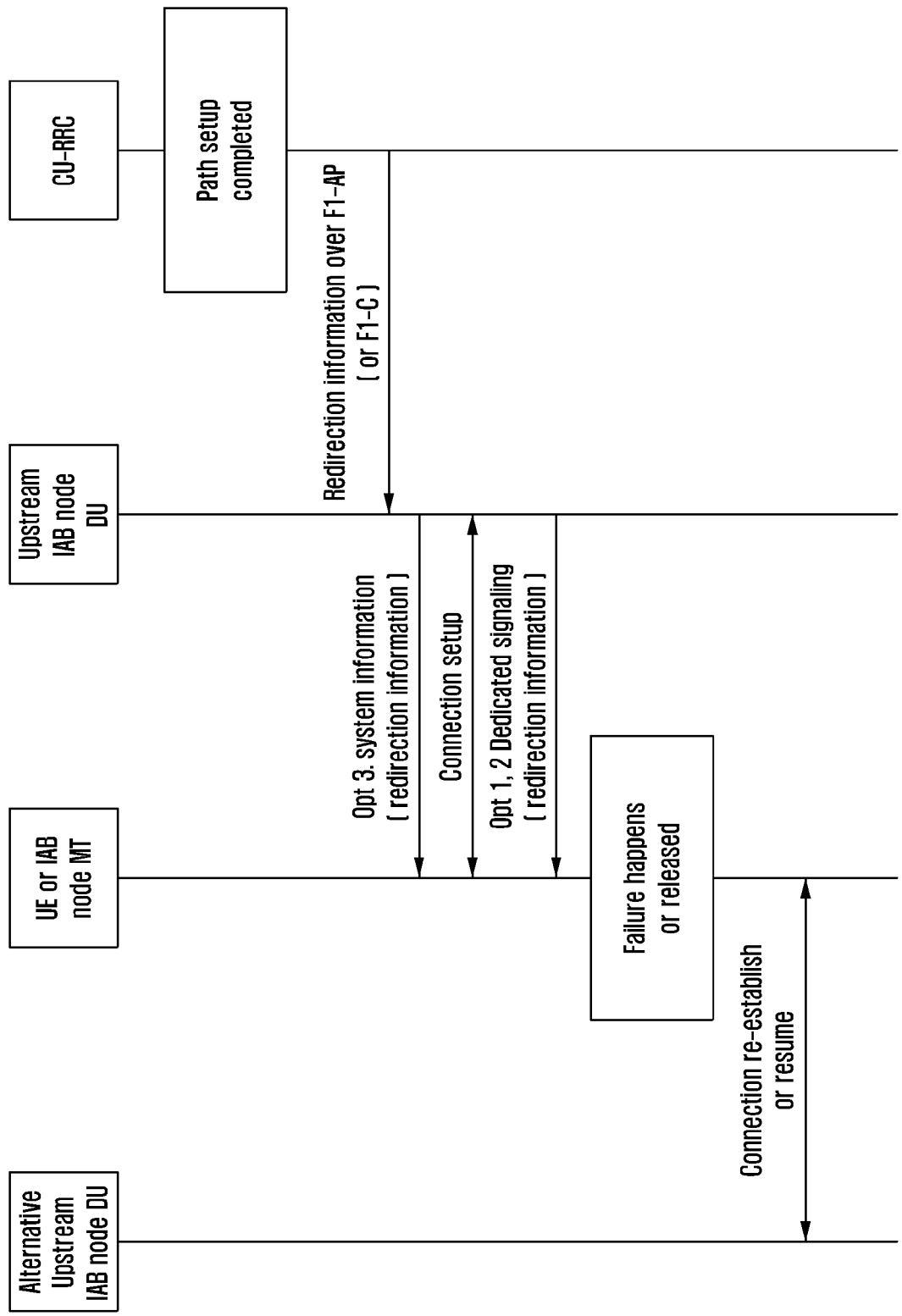

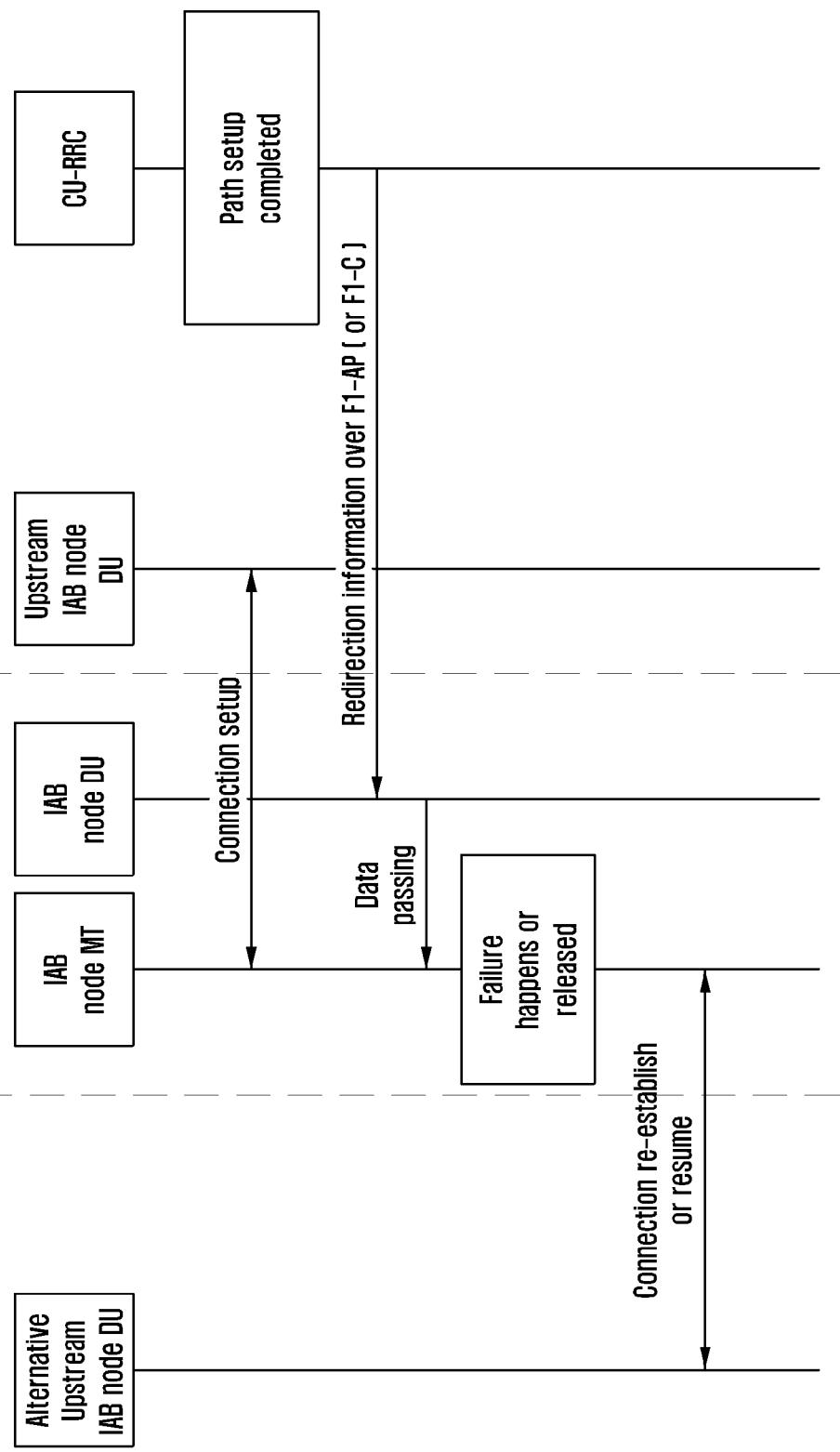
[Fig. 2J]

[Fig. 2K]
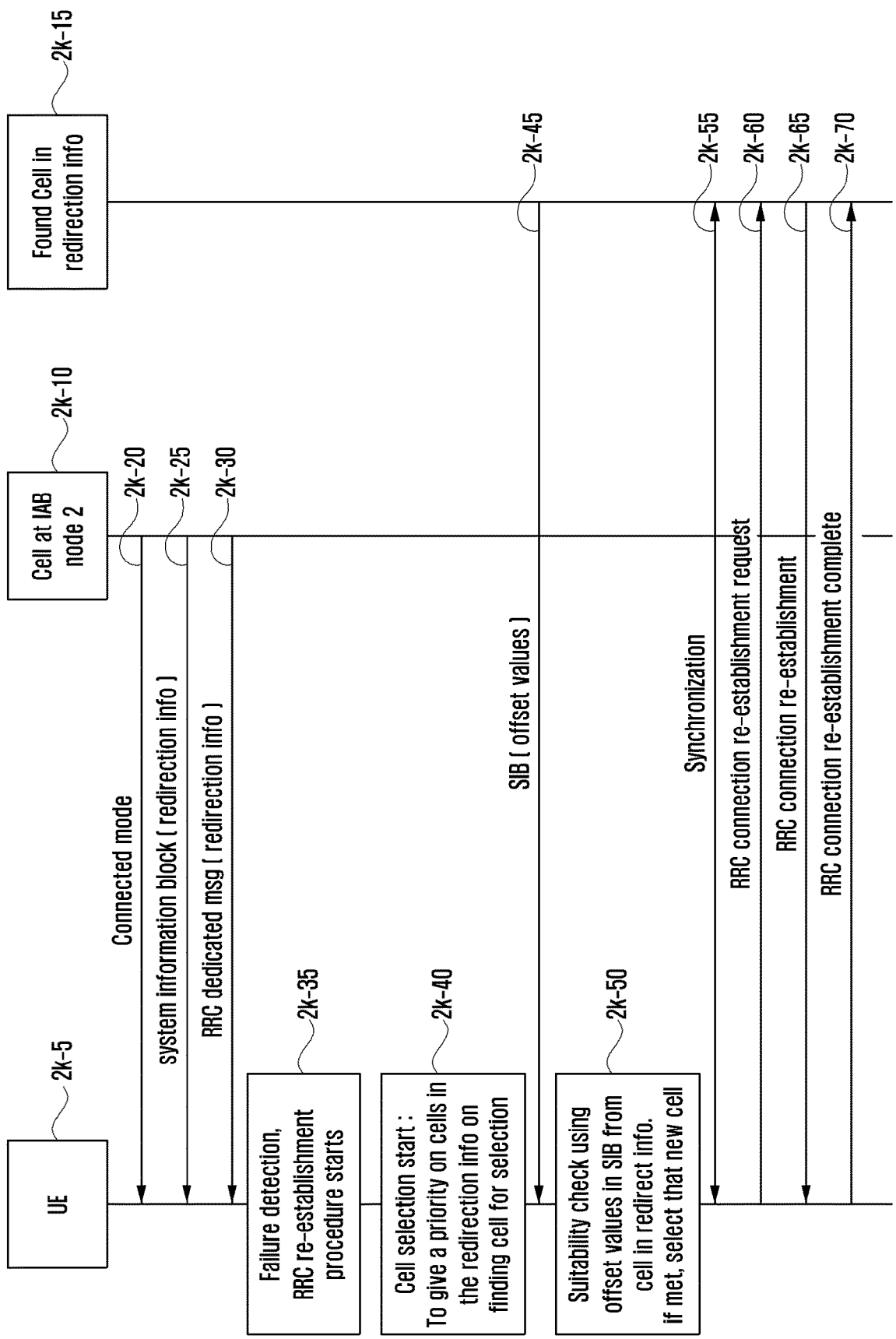

[Fig. 2L]
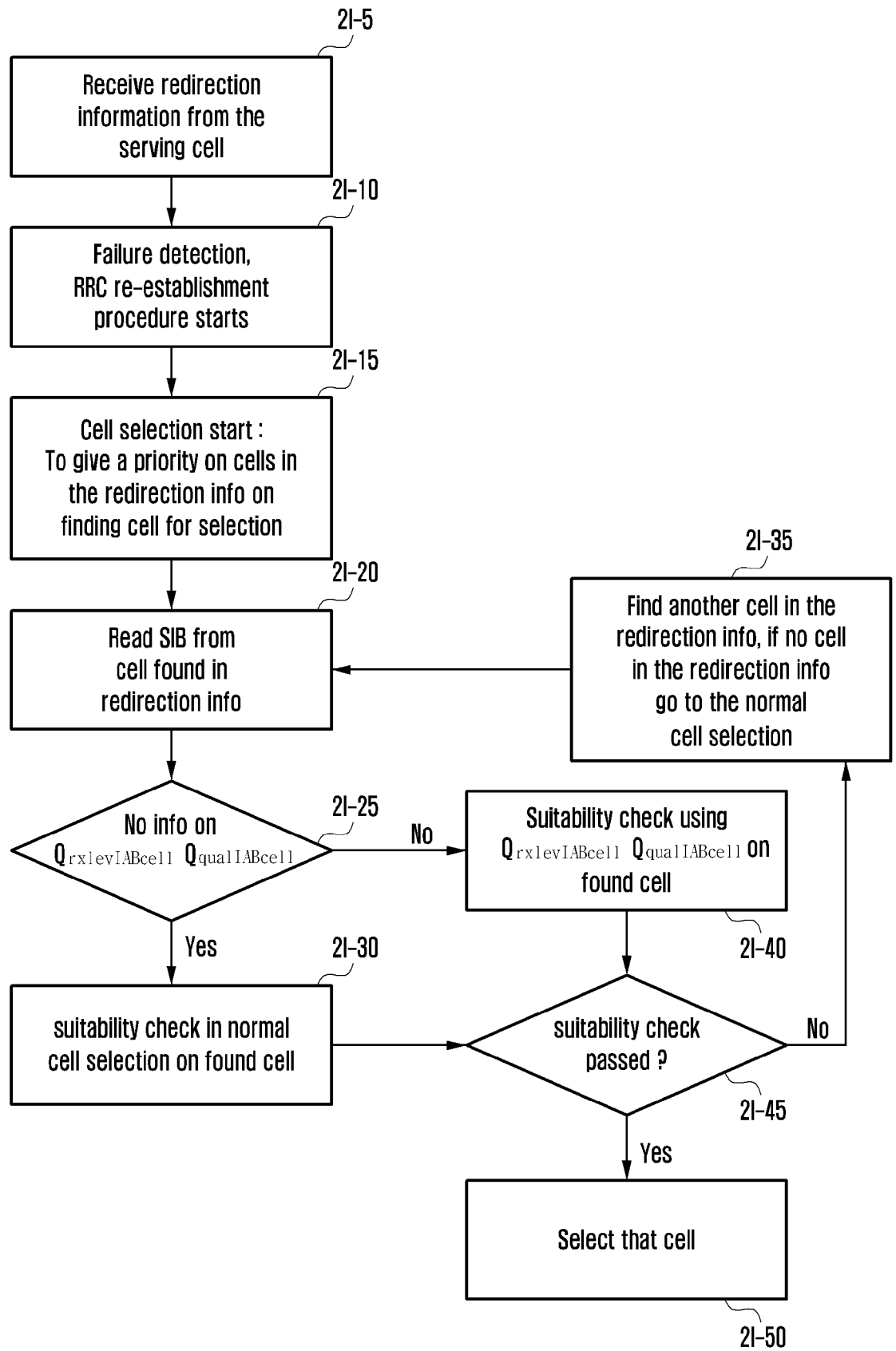

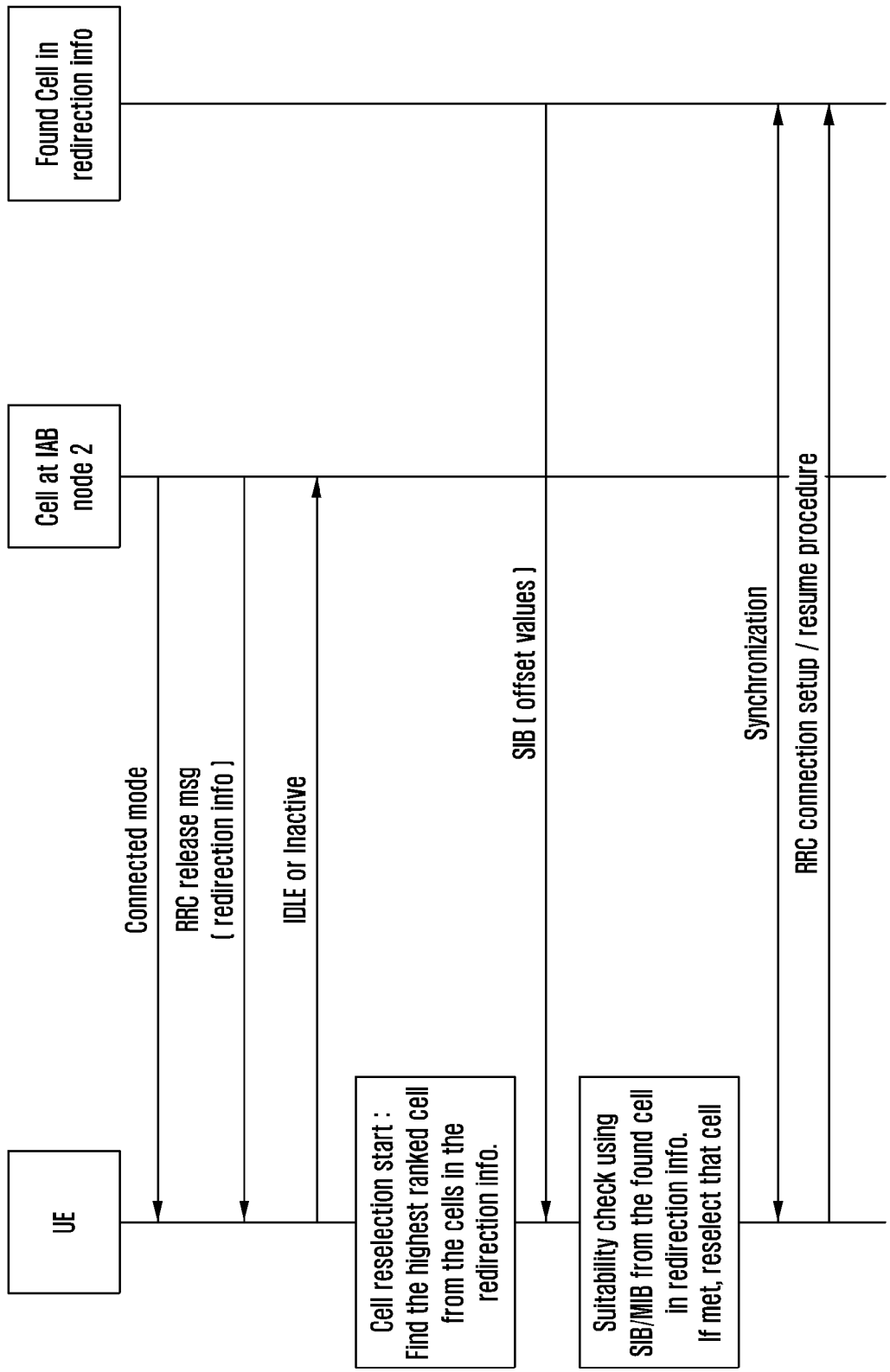
[Fig. 2M]

METHOD FOR PROCESSING NODE FAILURE IN INTEGRATED ACCESS AND BACKHAUL SYSTEM AND METHOD FOR TRANSMITTING REDIRECTION INFORMATION THEREIN

CROSS-REFERENCE TO RELATED APPLICATIONS

This application is a 371 of International Application No. PCT/KR2019/012624 filed on Sep. 27, 2019, which claims priority to Korean Patent Application No. 10-2018-0115256 filed on Sep. 27, 2018, Korean Patent Application No. 10-2019-0013032 filed on Jan. 31, 2019, Korean Patent Application No. 10-2019-0041474 filed on Apr. 9, 2019, and Korean Patent Application No. 10-2019-0099857 filed on Aug. 14, 2019, the disclosures of which are herein incorporated by reference in their entirety.

BACKGROUND

1. Field

The disclosure provides a method for processing a base station, to which an operation failure has occurred, in a radio integrated access and backhaul system. In addition, the disclosure provides a method for managing redirection information necessary for a terminal part to re-access a network in a radio integrated access and backhaul system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

If communication occurs between a core network and terminals in the case of a topology including multiple hops of IAB nodes, a radio link failure may occur depending on the channel situation of each IAB node. If an IAB node in the middle hop fails, offspring nodes thereof and terminals connected thereto have no direct connection between themselves and the failed node, and thus cannot recognize the failure. If the failure situation persists, downstream-connected IAB nodes and terminals continue to have the disconnected state. This may pose a serious problem. Accordingly, the disclosure is characterized by providing a method and an apparatus for solving the above-mentioned problem.

In addition, if communication occurs between a core network and terminals in the case of a topology including multiple hops of IAB nodes, the core-side access point is an IAB donor node. The donor node includes a centralized unit (CU), controls a distributed unit (DU), and controls operations related to data transmission/reception to/from terminals through the DU. In the case of a connection failure occurring to a mobile terminal (MT) part of a middle IAB node or a terminal receiving a service from an IAB node, or even in the case of a normal RRC release, accessing the same IAB donor that has already been accessed, for the purpose of network re-access, is a re-access method posing no burden on the terminals and the network as intra-HO. This is because, in the case of an architecture option 1 group, a PDCP and an RRC entity exist in the CU, and, for that reason, there is no packet loss due to PDCP reestablishment, there is no need for security refresh, and lossless HO is possible. To this end, redirection information needs to be given such that the terminal and the MT part of the IAB node become advantageous during re-access. Therefore, the disclosure is characterized by providing a method and an apparatus for providing the redirection information.

SUMMARY

In accordance with an aspect of the disclosure, there is provided a method by a first node in an integrated access and backhaul (IAB) system, the method comprising: detecting occurrence of a failure in connection with an upstream node; performing a first recovery procedure regarding the failure if the failure is detected; and based on a result of the first recovery procedure, transmitting a first message including information on the result of the first recovery procedure to a second node, which is a downstream node with regard to the first node.

In an exemplary embodiment, wherein the failure comprises at least one of a radio link failure (RLF), a handover failure, a reconfiguration failure, and an integrity check failure.

In an exemplary embodiment, the method further comprising operating a timer concurrently with performing the first recovery procedure regarding the failure, if the failure is detected.

In an exemplary embodiment, the method further comprising transmitting a second message including at least one of information indicating the failure and information indicating the performing of the first recovery procedure for the failure to the second node concurrently with performing the first recovery procedure regarding the failure, if the failure is detected.

In an exemplary embodiment, wherein at least one of the first message and the second message is transmitted through at least one of a backhaul adaptation protocol (BAP) layer signal, a master information block (MIB), a system information block (SIB) and a backhaul adaptation protocol (BAP) layer signal.

In accordance with another aspect of the disclosure, there is provided a first node in an integrated access and backhaul (IAB) system, the first node comprising: a first entity configured to transmit/receive signals with an upstream node; and a second entity configured to transmit/receive signals with a second node, which is a downstream node with regard to the first node, wherein: the first entity is configured to detect occurrence of a failure in connection with the upstream node and to perform a first recovery procedure regarding the failure if the failure is detected, and based on a result of the first recovery procedure, the second entity is configured to transmit a first message including information on the result of the first recovery procedure to the second node.

In accordance with another aspect of the disclosure, there is provided a method by a second node which is a downstream node with regard to a first node in an integrated access and backhaul (IAB) system, the method comprising: receiving, from the first node, a first message including information on a result of a first recovery procedure regarding a failure in connection with an upstream node; and performing, by the second node, a second recovery procedure in response to reception of the first message.

In accordance with another aspect of the disclosure, there is provided a second node which is a downstream node with regard to a first node in an integrated access and backhaul (IAB) system, the second node being configured to: receive, from the first node, a first message including information on a result of a first recovery procedure regarding a failure in connection with an upstream node; and perform a second recovery procedure in response to reception of the first message.

According to the disclosure described above, a base station having a failure occurred thereto determines, with reference to a timer, whether to release downstream terminals and IAB nodes such that they camp on a new cell or to maintain the same. If the timer expires, and if the downstream IAB nodes and terminals are notified of the failure of the base station, the terminals can perform an operation of searching for a new IAB node and thus can establish a faster connection with a new base station. In addition, terminals are prevented from requesting the base station having a failure occurred thereto to make an additional connection or from making a cell selection or reselection for the sake of paging or the like, thereby reducing the possibility of unnecessary data transmission/reception delay of the terminals.

In addition, according to the disclosure, if information of cells connected to the existing IAB donor is provided when a failure has occurs, after RRC is released, or when reestablishment is performed, a terminal that re-accesses the network at a later time will re-access the cell connected to the existing IAB donor, if possible, and the terminal and the base station have no additional overhead due to PDCP lossless transmission and security refresh.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 1A is a diagram illustrating the structure of an existing LTE system;

FIG. 1B is a diagram illustrating the wireless protocol structure of an existing LTE system;

FIG. 1C is a diagram illustrating the structure of a new radio mobile communication system to which the disclosure is applicable;

FIG. 1D is a diagram illustrating the wireless protocol structure of a new radio mobile communication system to which the disclosure is applicable;

FIG. 1E is a block diagram illustrating the inner structure of a terminal to which the disclosure is applied;

FIG. 1F is a block diagram illustrating the configuration of a NR base station according to the disclosure;

FIG. 1G is a diagram illustrating the configuration of an IAB system to which the disclosure is applied;

FIG. 1H illustrates an exemplary topology for describing the disclosure;

FIG. 1I illustrates an operation in a case in which RRC reestablishment succeeds before a given timer expires in an embodiment to which the disclosure is applied;

FIG. 1J illustrates an operation when a failure of an IAB node occurs, a timer starts, the MT part of the failed node performs a reestablishment operation, and an RRC setup is received before the timer expires according to another embodiment;

FIG. 1K illustrates a case in which a timer starts and then expires before a reestablishment operation ends successfully;

FIG. 1L is a diagram illustrating operations of a terminal, specifically MT part of a failed IAB node;

FIG. 1M is a diagram illustrating operations of a terminal or a downstream IAB node, which is connected to a failed IAB node or to the DU part of the failed IAB node, or which is camping thereon;

FIG. 2A is a diagram illustrating the structure of an existing LTE system;

FIG. 2B is a diagram illustrating the wireless protocol structure of an existing LTE system;

FIG. 2C is a diagram illustrating the structure of a new radio mobile communication system to which the disclosure is applicable;

FIG. 2D is a diagram illustrating the wireless protocol structure of a new radio mobile communication system to which the disclosure is applicable;

FIG. 2E is a block diagram illustrating the inner structure of a terminal to which the disclosure is applied;

FIG. 2F is a block diagram illustrating the configuration of a NR base station according to the disclosure;

FIG. 2G is a diagram illustrating the configuration of an IAB system to which the disclosure is applied;

FIG. 2H illustrates an exemplary topology for describing the disclosure;

FIG. 2I is a diagram illustrating possible signaling through which redirection information is delivered;

FIG. 2J is a diagram illustrating a case wherein, if redirection info is delivered to an upstream IAB node DU through F1-AP or F1-C signaling, information is bypassed between the DU and the MT of the IAB node;

FIG. 2K is a diagram illustrating a redirection operation in a terminal failure situation;

FIG. 2L is a diagram illustrating a flow of operations of a terminal; and

FIG. 2M is a diagram illustrating a case in which redirection information is delivered to an RRC release message.

DETAILED DESCRIPTION

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

Terms used in the following description to identify access nodes, terms referring to network entities, terms referring to messages, terms referring to interfaces between network entities, and terms referring to various kinds of identification information are for convenience of description. Therefore, the disclosure may not be limited by the terminologies provided below, and other terms that indicate subjects having equivalent technical meanings may be used.

For convenience of description, the disclosure uses terms and names defined in a 3GPP LTE (3rd Generation Partnership Project Long Term Evolution). However, the disclosure is not limited to the above terms and names, and is equally applicable to systems following other standards.

An integrated access and backhaul (IAB) is a concept denoting a kind of relay node configured such that a single node performs operations of a mobile terminal (MT) with regard to an upstream IAB node and plays the role of a base station with regard to a downstream IAB node. The relay node gathers upward traffic from downstream IAB nodes and upward traffic from normal nodes that have accessed the same, and delivers the traffic to an upstream IAB node. The relay node forwards traffic delivered downward from the core network to downstream IAB nodes as downward traffic, or to normal nodes that have accessed the same as downward traffic. In this process, a single node performs the operation of communicating with the upstream IAB node and the operation of communicating with downstream IAB nodes and terminals. Accordingly, the IAB refers to the nodes that combine the access and backhaul communication operations and the system of the topology including the nodes. The node directly connected to the core network is referred to as an IAB donor. The IAB donor has no upstream IAB node, and is connected to the core network by using an IP address system.

The disclosure provides a method wherein, in a system including multiple hops of IAB nodes, if a failure (including a radio connection failure) that can be recognized by an RRC layer occurs to a middle node, the same informs offspring IAB nodes and terminals of the fact that a failure has occurred to itself (failed IAB node), and performs IAB operation suspension and disabling operations.

FIG. 1A is a diagram illustrating the structure of an existing LTE system.

Referring to FIG. 1A, the radio access network of the LTE system may include evolved Nodes B (hereinafter, referred to as ENBs, nodes B, or base stations) 1a-05, 1a-10, 1a-15, and 1a-20, a mobility management entity (MME) 1a-25, and a serving-gateway (S-GW) 1a-30, as illustrated. User equipment (hereinafter, referred to as UE or terminal) 1a-35 may access an external network through the ENBs 1a-05 to 1a-20 and the S-GW 1a-30.

In FIG. 1A, the ENBs 1a-05 to 1a-20 may correspond to existing nodes B of a UMTS system. The ENBs may be connected to the UE 1a-35 through a wireless channel, and may perform more complicated roles than existing nodes B. In the LTE system, it is possible to provide all user traffic, including real-time services such as voice over IP (VoIP) through an Internet protocol, through a shared channel. Therefore, there is a need for a device for aggregating state information such as the UE buffer state, the available transmission power state, and the channel state, and then scheduling the same, and the ENBs 1a-05 to 1a-20 may be in charge thereof. A single ENB may normally control multiple cells. For example, in order to implement a transmission rate of 100 Mbps, a LTE system may use an orthogonal frequency division multiplexing (OFDM) as a radio access technology in a bandwidth of 20 MHz, for example. It is also possible to apply an adaptive modulation & coding (AMC) scheme which determines the modulation scheme and the channel coding rate according to the terminal's channel state. The S-GW 1a-30 is a device configured to provide a data bearer, and may generate or remove the data bearer under the control of the MME 1a-25. The MMEs are devices that handle not only the terminal-related mobility management function, but also various control functions, and may be connected to multiple base stations.

FIG. 1B is a diagram illustrating the wireless protocol structure of an existing LTE system.

Referring to FIG. 1B, the wireless protocol of the LTE system may include packet data convergence protocols (PDCPs) 1b-05 and 1b-40, radio link controls (RLCs) 1b-10 and 1b-35, and medium access controls (MACs) 1b-15 and 1b-30 on the terminal side and on the ENB side, respectively. The PDCPs may be in charge of operations such as IP header compression/restoration. Major functions of the PDCPs may be summarized as follows:

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink.

The radio link controls (RLCs) 1b-10 and 1b-35 may perform operations such as reconfiguring a PDCP packet data unit (PDU) into an appropriate size and performing an ARQ operation and the like. Major functions of the RLCs may be summarized as follows:

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment.

The MACs 1b-15 and 1b-30 may be connected to multiple RLC layer devices configured in a single terminal, and may perform operations of multiplexing RLC PDUs to a MAC PDU and demultiplexing RLC PDUs from a MAC PDU. Major functions of the MACs may be summarized as follows:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding.

The physical layers 1b-20 and 1b-25 may perform operations of channel-coding and modulating upper-layer data, generating an OFDM symbol therefrom, and transmitting the same through a wireless channel, or demodulating an OFDM symbol received through the wireless channel, channel-decoding the same, and delivering the same to the upper layer.

FIG. 1C is a diagram illustrating the structure of a new radio mobile communication system.

Referring to FIG. 1C, the radio access network of the new radio (hereinafter, referred to as NR or 2g) mobile communication system may include a new radio node B (hereinafter, referred to as NR gNB or NR base station) 1c-10 and a new radio core network (NR CN) 1c-05. New radio user equipment (NR UE or terminal) 1c-15 may access an external network through the NR gNB 1c-10 and the NR CN 1c-05.

In FIG. 1C, the NR gNB 1c-10 may corresponds to an evolved node B (eNB) of the existing LTE system. The NR gNB may be connected to the NR UE 1c-15 through a wireless channel, and may provide a superior service than in the case of the existing node B. In the NR mobile communication system, all user traffic may be provided through a shared channel. Therefore, there is a need for a device for aggregating state information such as the UE buffer state, the available transmission power state, and the channel state, and then scheduling the same, and the NR NB 1c-10 may be in charge thereof. A single NR gNB may control multiple cells. In the NR mobile communication system, a bandwidth equal to or larger than the current maximum bandwidth may be applied in order to implement super-fast data transmission compared with the current LTE. In addition, orthogonal frequency division multiplexing (OFDM) may be used as the radio access technology, and beamforming technology may be additionally combined therewith. It is also possible to apply an adaptive modulation & coding (AMC) scheme which determines the modulation scheme and the channel coding rate according to the terminal's channel state. The NR CN 1c-05 may perform functions such as mobility support, bearer configuration, and QoS configuration. The NR CN is a device that handles not only the terminal-related mobility management function, but also various control functions, and may be connected to multiple base stations. In addition, the NR mobile communication system may inter-work with an existing LTE system, and the NR CN may be connected to the MME 1c-25 through a network interface. The MME may be connected to an eNB 1c-30 (existing base station).

FIG. 1D is a diagram illustrating the wireless protocol structure of a NR mobile communication system to which the disclosure is applicable.

Referring to FIG. 1D, the wireless protocol of the NR mobile communication system includes NR service data adaption protocols (SDAPs) 1d-01 and 1d-45, NR PDCPs 1d-05 and 1d-40, NR RLCs 1d-10 and 1d-35, and NR MACs 1d-15 and 1d-30 on the terminal side and on the NR base station side, respectively.

Major functions of the NR SDAPs 1d-01 and 1d-45 may include some of the following functions:

Transfer of user plane data

Mapping between a QoS flow and a DRB for both DL and UL

Marking QoS flow ID in both DL and UL packets

Reflective QoS flow to DRB mapping for the UL SDAP PDUs.

With regard to a SDAP layer device, the terminal may uses a radio resource control (RRC) message to receive a configuration regarding whether to use the header of the SDAP layer device or to use the function of the SDAP layer device with regard to each PDCP layer device, with regard to each bearer, or with regard to each logical channel. If the SDAP header is configured, the terminal may indicate, by using a one-bit indicator (NAS reflective QoS) reflective of the non-access stratum (NAS) quality of service (QoS) of the SDAP header and a one-bit indicator (AS reflective QoS) reflective of the access stratum (AS) QoS, such that the terminal can update or reconfigure mapping information regarding the data bearer and the QoS flow of the uplink and the downlink. The SDAP header may include QoS flow ID information indicating the QoS. The QoS information may be used as data processing priority for supporting an efficient service, scheduling information, or the like.

Major functions of the NR PDCPs 1d-05 and 1d-40 may include some of the following functions:

Header compression and decompression: ROHC only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink.

In the above description, the reordering function of the NR PDCP devices may refer to a function of reordering PDCP PDUs received from the lower layer, based on the PDCP sequence number (SN). The reordering function of the NR PDCP devices may include a function of delivering data to the upper layer in the realigned order, or may include a function of directly delivering the data without considering the order. The reordering function of the NR PDCP devices may include a function of recording PDCP PDUs lost as a result of reordering, a function of reporting the state of the lost PDCP PDUs to the transmitting side, and a function of requesting retransmission of the lost PDCP PDUs.

Major functions of the NR RLCs 1d-10 and 1d-35 may include some of the following functions:

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment.

In the above description, the in-sequence delivery function of the NR RLC devices may refer to a function of delivering RLC SDUs received from the lower layer to the upper layer in a sequence. If a single RLC SDU has been segmented into multiple RLC SDUs and then received, the in-sequence delivery function of the NR RLC devices may refer to a function of reassembling and delivering the same.

The in-sequence delivery function of the NR RLC devices may refer to a function of reordering received RLC PDUs with reference to the RLC sequence number (SN) or PDCP SN, a function of recording RLC PDUs lost as a result of reordering, a function of reporting the state of the lost PDCP PDUs to the transmitting side, and a function of requesting retransmission of the lost PDCP PDUs.

The in-sequence delivery function of the NR RLC devices may include, if there is a lost RLC SDU, a function of delivering only RLC SDUs that precede the lost RLC SDU to the upper layer in a sequence.

The in-sequence delivery function of the NR RLC devices may include, if there is a lost RLC SDU, but if a predetermined timer expires, a function of delivering all RLC SDUs received before the timer started to the upper layer in a sequence.

The in-sequence delivery function of the NR RLC devices may include, if there is a lost RLC SDU, but if a predetermined timer expires, a function of delivering all currently received RLC SDUs to the upper layer in a sequence.

The NR RLC devices may process RLC PDUs in the received order, regardless of the order of the sequence number (out-of-sequence delivery) and may deliver the same to the NR PDCP devices.

If segments are received, the NR RLC devices may receive segments stored in the buffer or segments to be received later, may reconfigure the same into a single complete RLC PDU, and then may deliver the same to the NR PDCP devices.

The NR RLC layers may not include the concatenation function, which may be performed by the NR MAC layers or replaced with the multiplexing function of the NR MAC layers.

In the above description, the out-of-sequence delivery function of the NR RLC devices may refer to a function of directly delivering RLC SDUs received from the lower layer to the upper layer regardless of the order. The out-of-sequence delivery function of the NR RLC devices may refer to, if a single RLC SDU has been segmented into multiple RLC SDUs and then received, a function of reassembling and delivering the same. The out-of-sequence delivery function of the NR RLC devices may include a function of storing the RLC SN or PDCP SN of received RLC PDUs and recording RLC PDUs lost as a result of reordering.

The NR MACs 1d-15 and 1d-30 may be connected to multiple NR RLC layer devices configured in a single terminal, and major functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding.

The NR PHY layers 1d-20 and 1d-25 may perform operations of channel-coding and modulating upper-layer data, generating an OFDM symbol therefrom, and transmitting the same through a wireless channel, or demodulating an OFDM symbol received through the wireless channel, channel-decoding the same, and delivering the same to the upper layer.

FIG. 1E is a block diagram illustrating the inner structure of a terminal to which the disclosure is applied.

Referring to the diagram, the terminal includes a radio frequency (RF) processing unit 1e-10, a baseband processing unit 1e-20, a storage unit 1e-30, and a control unit 1e-40.

The RF processing unit 1e-10 performs functions for transmitting/receiving signals through a wireless channel, such as band conversion of signals and amplification thereof. That is, the RF processing unit 1e-10 up-converts a baseband signal provided from the baseband processing unit 1e-20 into a RF band signal, transmits the same through an antenna, and down-converts a RF band signal received through the antenna into a baseband signal. For example, the RF processing unit 1e-10 may include a transmitting filter, a receiving filter, an amplifier, a mixer, an oscillator, a digital to analog convertor (DAC), an analog to digital convertor (ADC), and the like. Although only one antenna is illustrated in the diagram, the terminal may include multiple antennas. In addition, the RF processing unit 1e-10 may include multiple RF chains. Moreover, the RF processing unit 1e-10 may perform beamforming. For the sake of the beamforming, the RF processing unit 1e-10 may adjust the phase and magnitude of respective signals transmitted/received through multiple antennas or antenna elements. In addition, the RF processing unit may perform MIMO, and may receive multiple layers when performing the MIMO operation.

The base band processing unit 1e-20 performs a function for conversion between a baseband signal and a bit string according to the physical layer specification of the system. For example, during data transmission, the baseband processing unit 1e-20 encodes and modulates a transmission bit string, thereby generating complex symbols. In addition, during data reception, the baseband processing unit 1e-20 demodulates and decodes a baseband signal provided from the RF processing unit 1e-10, thereby restoring a reception bit string. For example, when the orthogonal frequency division multiplexing (OFDM) scheme is followed, the baseband processing unit 1e-20 encodes and modulates a transmission bit string during data transmission, thereby generating complex symbols, maps the complex symbols to subcarriers, and configures OFDM symbols through inverse fast Fourier transform (IFFT) operation and cyclic prefix (CP) insertion. In addition, during data reception, the baseband processing unit 1e-20 divides a baseband signal received from the RF processing unit 1e-10 with regard to each OFD symbol, restores signals mapped to subcarriers through fast Fourier transform (FFT), and restores the reception bit string through demodulation and decoding.

The baseband processing unit 1e-20 and the RF processing unit 1e-10 transmit and receive signals as described above. Accordingly, the baseband processing unit 1e-20 and the RF processing unit 1e-10 may be referred to as transmitting units, receiving units, transmitting/receiving units, or communication units. Moreover, at least one of the baseband processing unit 1e-20 and the RF processing unit 1e-10 may include multiple communication modules in order to support different multiple radio access technologies. In addition, at least one of the baseband processing unit 1e-20 and the RF processing unit 1e-10 may include different communication modules in order to process signals in different frequency bands. For example, the different radio access technologies may include a wireless LAN (for example, IEEE 802.11), a cellular network (for example, LTE), and the like. In addition, the different frequency bands may include a super-high frequency (SHF) (for example, 2. NRHz, NRhz) band and a millimeter wave (for example, 60 GHz) band.

The storage unit 1e-30 stores data for operation of the terminal, such as a basic program, an application program, and configuration information. Particularly, the storage unit 1e-30 may store information regarding a second access node that performs wireless communication by using a second radio access technology. In addition, the storage unit 1e-30 provides the stored data at the request of the control unit 1e-40.

The control unit 1e-40 controls overall operations of the terminal. For example, the control unit 1e-40 transmits/receives signals through the baseband processing unit 1e-20 and the RF processing unit 1e-10. In addition, the control unit 1e-40 records and reads data in the storage unit 1e-40. To this end, the control unit 1e-40 may include at least one processor. For example, the control unit 1e-40 may include a communication processor (CP) configured to perform control for communication and an application processor (AP) configured to control the upper layer, such as an application program.

FIG. 1F is a block diagram illustrating the configuration of a NR base station according to the disclosure.

As illustrated in the diagram, the base station includes a RF processing unit 1f-10, a baseband processing unit 1f-20, a backhaul communication unit 1f-30, a storage unit 1f-40, and a control unit 1f-50.

The RF processing unit 1f-10 performs functions for transmitting/receiving signals through a wireless channel, such as band conversion of signals and amplification thereof. That is, the RF processing unit 1f-10 up-converts a baseband signal provided from the baseband processing unit 1f-20 into a RF band signal, transmits the same through an antenna, and down-converts a RF band signal received through the antenna into a baseband signal. For example, the RF processing unit 1f-10 may include a transmitting filter, a receiving filter, an amplifier, a mixer, an oscillator, a DAC, an ADC, and the like. Although only one antenna is illustrated in the diagram, the first access node may include multiple antennas. In addition, the RF processing unit 1f-10 may include multiple RF chains. Moreover, the RF processing unit 1f-10 may perform beamforming. For the sake of the beamforming, the RF processing unit 1f-10 may adjust the phase and magnitude of respective signals transmitted/received through multiple antennas or antenna elements. The RF processing unit may perform a downward MIMO operation by transmitting at least one layer.

The base band processing unit 1f-20 performs a function for conversion between a baseband signal and a bit string according to the physical layer specification of the first radio access technology. For example, during data transmission, the baseband processing unit 1f-20 encodes and modulates a transmission bit string, thereby generating complex symbols. In addition, during data reception, the baseband processing unit 1f-20 demodulates and decodes a baseband signal provided from the RF processing unit 1f-10, thereby restoring a reception bit string. For example, when the OFDM scheme is followed, the baseband processing unit 1f-20 encodes and modulates a transmission bit string during data transmission, thereby generating complex symbols, maps the complex symbols to subcarriers, and configures OFDM symbols through IFFT operation and CP insertion. In addition, during data reception, the baseband processing unit 1f-20 divides a baseband signal received from the RF processing unit 1f-10 with regard to each OFD symbol, restores signals mapped to subcarriers through a FFT operation, and restores the reception bit string through demodulation and decoding. The baseband processing unit 1f-20 and the RF processing unit 1f-10 transmit and receive signals as described above. Accordingly, the baseband processing unit 1f-20 and the RF processing unit 1f-10 may be referred to as transmitting units, receiving units, transmitting/receiving units, communication units, or wireless communication units.

The backhaul communication unit 1f-30 provides an interface for communicating with other nodes inside the network. That is, the backhaul communication unit 1f-30 converts a bit string transmitted from the main base station to another node (for example, auxiliary base station or core network) into a physical signal, and converts a physical signal received from the other node into a bit string.

The storage unit 1f-40 stores data for operation of the main base station, such as a basic program, an application program, and configuration information. Particularly, the storage unit 1f-40 may store information regarding a bearer assigned to an accessed terminal, a measurement result reported from the accessed terminal, and the like. In addition, the storage unit 1f-40 may store information serving as a reference to determine whether to provide a terminal with multi-connection or to abort the same. Furthermore, the storage unit 1f-40 provides the stored data at the request of the control unit 1f-50.

The control unit 1f-50 controls overall operations of the main base station. For example, the control unit 1f-50 transmits/receives signals through the baseband processing unit 1f-20 and the RF processing unit 1f-10, or through the backhaul communication unit 1f-30. In addition, the control unit 1f-50 records and reads data in the storage unit 1f-40. To this end, the control unit 1f-50 may include at least one processor.

FIG. 1G is a diagram illustrating the configuration of an JAB system to which the disclosure is applied. Reference sign 1g-1 denotes an JAB donor node which performs wired communication with a core network 1g-5. The JAB donor node includes a centralized unit (CU) 1g-10 and multiple distributed units (DUs) 1g-15. The CU includes a control plane (CP) and a user plane (UP) therein. The CP exchanges control signals necessary for data transmission/reception and connection between the JAB donor node and DUs of downstream JAB nodes. The DU receive control signals from the CU and perform data transmission/reception with terminals. Other JAB nodes than the JAB donor node have at least one radio connection established with the CN, and each IAB node 1g-20 may have a terminal 1g-25 that receives a service therefrom and a downstream IAB node 1g-30 that receives a service therefrom. IAB nodes have a wireless backhaul link 1g-35 therebetween, and an IAB node and a terminal have a wireless access link 1g-40 therebetween. The wireless backhaul and the wireless access links may use the same frequency resources or separate frequency resources.

FIG. 1H illustrates an exemplary topology for describing the disclosure. It is assumed that end user UE1 1h-1 can transmit/receive data through a single data path. Alternatively, even if data can be transmitted/received by using multiple paths, the method according to the disclosure is applicable to a case in which a path switch through an RRC message needs to accompany between the multiple paths. It is assumed in this example that a data path is already configured through IAB 2, and a radio link failure has occurred between a mobile terminal (MT) of JAB node 2 and that of IAB node 1. In a normal case, if a RLF occurs, the terminal performs an RRC reestablishment operation. When performing this operation, the terminal performs a cell selection, re-accesses the selected cell, receives a connection reestablishment message form the core network, and transmits "complete" in response to the message. In this case, it is impossible to know how long time will be necessary for the cell selection, and, if a new cell is accessed, and if the corresponding cell has no terminal context, the same may go idle.

FIG. 1I illustrates an operation in a case in which RRC reestablishment succeeds before a given timer expires according to an embodiment to which the disclosure is applied. The terminal receiving a service from an IAB node that has failed, or the MT part 1i-1 of a downstream IAB node receiving a service from the IAB node that has failed, may remain connected to the IAB node 1i-5 that has failed, or may be camping while maintaining an idle or inactive state (1i-3). The MT part 1i-10 of the IAB node remains connected to the serving cell (1i-30). The serving cell may be the cell that IAB node 2 in FIG. 1H serves. The MT part of the IAB node may configure a timer value through dedicated signaling in the connected state (1i-35), or may receive a configuration through system information (1i-25). A failure may occur to the MT part in the connected state (1i-40). Although a radio link failure is given as an example in this description, all examples of failure in an normal RRC process, such as a handover failure, a reconfiguration failure, and an integrity check failure, may be applied. If a failure occurs, the MT operates a predetermined timer (1i-45). In this process, failure indication signaling may exist between the MT part of the failed IAB node and the base station part (1i-90). If a failure occurs, the MT operates a timer and simultaneously performs an RRC connection reestablishment operation. If the reestablishment operation ends successfully before the timer expires, the MT stops the timer (1i-75). In this process, the MT may transmit a recovery indication to the DU part of the IAB node or to the base station part (1i-95). The RRC reestablishment operation may include a cell selection (1i-50), a procedure (1i-55) of random access to the selected cell (1i-20), transmission (1i-60) of an RRC reestablishment request message to the target cell 1i-20 of the MT, reception (1i-65) of the RRC reestablishment message, and transmission (1i-70) of an RRC reestablishment complete message. As a condition to stop the timer, reception (1i-65) of the RRC reestablishment message by the MT may be considered. In addition, after receiving the message, transmission (1i-70) of the RRC reestablishment complete message may also be considered as the stop condition. While the timer operates in this manner, the DU part of the failed IAB node connected to the MT, or the failed IAB node may not allow additional connection from a terminal, or may perform an operation of preventing a terminal in an inactive/idle mode from camping through cell (re)selection. If the timer starts (1i-45), an indication may be transmitted to a master information block (MIB), which is transmitted to a SSB, to indicate that the cell was barred (1i-80). Or/and barring factors may be configured with regard to the access category of all terminals, the access barring factor value among the factors may be changed to zero with regard to all access categories and access identifies, and the changed system information may be transmitted. The failed IAB node continues the operations 1i-80 and 1i-85 until reestablishment succeeds and thus the timer stops. If the timer stops after successful reestablishment (1i-75), SSB and MIB transmissions may fall back so as to transmit the content before the timer operation (1i-100). Likewise, instead of the operation of transmitting system information after configuring the barring factor to zero, the system information may be transmitted after configuring the same to the value before the timer started (1i-105). The cell barred indication of the SSB/MIB and the broadcasting after selecting the accessing barring factor in the SIB to zero, may be referred to as IAB suspension.

According to another embodiment, without applying the timer, IAB suspension of the DU may be directly started or stopped according to the reestablishment state of the terminal. If a failure described above (for example, RLF) occurs in the MT, the MT performs an RRC reestablishment procedure, and the IAB node of the MT or the DU part simultaneously performs an IAB suspension operation. In this case, a failure indication may be delivered from the MT to the DU part or the IAB node. Delivery of the failure indication may mean that the IAB suspension operation is performed.

If the MT succeeds in the RRC reestablishment procedure due to the failure while performing the IAB suspension operation started by the DU part or the IAB node, the IAB suspension operation that has been performed is stopped. That is, a fallback to the time before IAB suspension (cellBarred is removed from the SSB and the MIB, and the barrier factor that has been configured to zero with regard to all access categories is removed), and new system information and SSB information may be received from the donor CU and then transmitted. If a failure occurs in the MT, if T311 that has been operating in the MT expires after a failure has occurred, if a successful cell selection is followed by a failure of RACH operation in the corresponding cell, or if a successful cell selection is followed by a successful RACH in the corresponding cell and is followed by expiration of T301, the DU part of the MT or the IAB node may stop the IAB suspension operation that has originally been proceeding, or may return to the state prior thereto, and may perform step 1k-100, step 1k-105, or step 1k-110.

As the IAB suspension operation among the above operations, specifically, the DU part of the failed IAB node connected to the MT, or the failed IAB node may not allow additional connection from a terminal, or may perform an operation of preventing a terminal in an inactive/idle mode from camping through cell (re)selection. An indication may be transmitted to a master information block (MIB), which is transmitted to a SSB, to indicate that the cell was barred (1*i*-80). Or/and barring factors may be configured with regard to the access category of all terminals, the access barring factor value among the factors may be changed to zero with regard to all access categories and access identifies, and the changed system information may be transmitted.

Above steps **1*k*-100, 1*k*-105, and 1*k*-110** will now be described in detail. The UD part of the failed node or the failed IAB node performs at least one of the following three operations:

As RRC dedicated signaling, the DU part or failed IAB node may transmit a message that RRC-releases respective terminals and downstream IAB nodes in connected states. This may be referred to as option 1 (**1*k*-100**). The message may be transmitted through an RRC dedicated message, may be transmitted to the MAC CE, or may be transmitted through the control channel of PHY. Instead of the RRC release message, a message including an indicator meaning a node failure indication may be transmitted. Alternatively, the indicator may be transmitted through RRC dedicated signaling, a MAC CE, or a PHY signal. If the node failure indication is received, the downstream IAB node that received the same may perform RRC reestablishment.

Alternatively, the DU part or the failed IAB node may insert a mark of RRC release, reconnection, or reestablishment failure into a system information block, a MIB, or a synchronization signal block (SSB) and then transmit the same. This may be referred to as option 2 (**1*k*-105**). This may be a one-bit indicator in terms of a Boolean value.

As another method, transmission of a reference signal used for radio link monitoring (RLM) may be stopped. This may be referred to as option 3 (**1*k*-110**). This methods prevents terminals from searching for cells such that terminals cannot sense existence of cells, and thus is referred to as IAB disabling. This reference signal may be a SSB used for RLM-RS and/or a SSB or a CSI-RS used for cell quality measurement regardless of the CIS-RS or the RLM-RS.

In addition, transmission of the system information may be stopped, or transmission of the DMRS may be stopped. Alternatively, the service may be stopped, or shutdown or power off may be performed.

If the method of option 1 or 2 is performed, the terminal that has been connected to or camping on the failed IAB node and the MT part of the downstream IAB node may transition to an idle mode.

In the case of option 3, the terminal that has been connected to or camping on the failed IAB node and the MT part of the downstream IAB node may perform an RRC reestablishment procedure in the connected states. The methods of options 1, 2, and 3 may also be started if a failure occurs during the reestablishment process of the MT part of the failed IAB node before the timer expires.

The failure that may occur during the reestablishment process may include the following cases: a predefined timer expires during a cell selection operation (for example, T311 expires); a cell selection succeeds, a random access preamble is transmitted to the target cell, and a RACH failure then occurs while no RAR is received for a predefined time window; and an RRC reestablishment request is made, and a reestablishment message or a setup message then fails to be received from the target cell until a predefined timer expires, or the target cell becomes unsuitable before the defined timer expires (for example, T301 expires).

As another embodiment, the methods of **1*k*-100, 1*k*-105, and 1*k*-110** may be performed instantly without an IAB suspension process if the MT starts to fail.

As another embodiment, the methods of **1*k*-100, 1*k*-105, and 1*k*-110 may deliver different information depending on the state of a recovery process if a failure (for example, RLF) of the MT occurs. The failure may refer to a RLF of the backhaul link between the MT and the parent IAB node, or reception of a RLF notification from the parent IAB node of the MT. If a failure occurs to the MT, or if a recovery related to the failure (or operation of reestablishment, searching for a different cell, or performing re-access (including random access) to the same or different cell) starts, the IAB node of the MT to which the failure has occurred, or the DU may deliver an indication of the failure occurrence to downstream IAB nodes and access UEs that accessed the same. The indication may include an indication of ongoing recovery. As a method for transmitting the indication regarding the failure occurrence, the same may be transmitted through a system information block including SIB1, or one of the methods of 1*k*-100, 1*k*-105, and 1*k*-110** may be used.

In addition, if the MT succeeds while performing recovery, the indication of recovery success may likewise be delivered to downstream IAB nodes and access UEs. As used herein, the recovery may mean a successful reestablishment operation, or may refer to re-access (including random access) or handover to a different or identical cell. As a method for delivering the indication of recovery success in this case, the same may be transmitted through the system information block including SIB1, or one of the methods of **1*k*-100, 1*k*-105, and 1*k*-110** may be used.

In addition, if the MT fails while performing recovery, a failure indicator may be delivered to downstream IAB nodes and access UEs. As a method for delivering the failure indicator, the same may be transmitted through the system information block including SIB1, or one of the methods of **1*k*-100, 1*k*-105, and 1*k*-110** may be used.

After receiving the above pieces of information, the IAB node may stop the operation of transmitting/receiving data to/from the failed IAB node, or may perform an operation of storing the same in the buffer thereof. Alternatively, the IAB node may transmit/receive data while maintaining the connection. In addition, the IAB node may perform an operation of searching for and selecting another IAB node. The IAB node may perform an operation of evaluating whether a cell found as a result of the cell search is a cell in which IAB node capability exists or a suitable cell in the existing operation. In addition, the DU of the corresponding IAB node may perform the IAB suspending operation in the preceding embodiment. If the failed MT indicates recovery failure, and if a downstream IAB node receives the indication, the MT of the downstream IAB node may disconnect from the IAB node of the failed MT and may connect to a newly selected cell, or may perform an RRC reestablishment operation.

FIG. 1J illustrates an operation when a failure of an IAB node occurs, a timer starts, the MT part of the failed node performs a reestablishment operation, and an RRC setup is received before the timer expires, according to another embodiment. If no UE context of the MT part exists in the target cell, and if a fallback to an RRC setup is made, the same is also considered as a recovery success, and the timer is stopped. While the timer operates, the IAB suspension operation as in FIG. 1I is performed. The terminal receiving a service from the failed IAB node, or the MT part 1*j*-1 of a downstream IAB node receiving a service from the failed IAB node, may remain connected to the failed IAB node 1*j*-5, or may be camping while maintaining an idle or inactive state (1*j*-3). The MT part 1*j*-10 of the IAB node remains connected to the serving cell (1*j*-30). The serving cell may be the cell that IAB node 2 in FIG. 1H serves. The MT part of the IAB node may configure a timer value through dedicated signaling in the connected state (1*j*-35), or may receive a configuration through system information (1*j*-25). A failure may occur to the MT part in the connected state (1*j*-40). Although a radio link failure is given as an example in this description, all examples of failure in an normal RRC process, such as a handover failure, a reconfiguration failure, and an integrity check failure, may be applied. If a failure occurs, the MT operates a predetermined timer (1*j*-45). In this process, failure indication signaling may exist between the MT part of the failed IAB node and the base station part (1*j*-90). If a failure occurs, the MT operates a timer and simultaneously performs a RRF connection reestablishment operation. If the reestablishment operation ends successfully before the timer expires, the MT stops the timer (1*j*-75). In this process, the MT may transmit a recovery indication to the DU part of the IAB node or to the base station part (1*j*-95). The RRC reestablishment operation may include a cell selection (1*j*-50), a procedure (1*j*-55) of random access to the selected cell (1*j*-20), transmission (1*j*-60) of an RRC reestablishment request message to the target cell 1*j*-20 of the MT, reception (1*j*-65) of an RRC setup message, and transmission (1*j*-70) of an RRC setup complete message. As a condition to stop the timer, reception (1*j*-65) of the RRC setup message by the MT may be considered. In addition, after receiving the message, transmission (1*j*-70) of the RRC setup complete message may also be considered as the condition to stop the timer. While the timer operates in this manner, the DU part of the failed IAB node connected to the MT, or the failed IAB node may not allow additional connection from a terminal, or may perform an operation of preventing a terminal in an inactive/idle mode from camping through cell (re)selection. If the timer starts (1*j*-45), an indication may be transmitted to a master information block (MIB), which is transmitted to a SSB, to indicate that the cell was barred (1*j*-80). Or/and barring factors may be configured with regard to the access category of all terminals, the access barring factor value among the factors may be changed to zero with regard to all access categories and access identifies, and the changed system information may be transmitted. The failed IAB node continues the operations 1*j*-80 and 1*j*-85 until reestablishment succeeds and thus the timer stops. If the timer stops after successful reestablishment (1*j*-75), SSB and MIB transmissions may fall back so as to transmit the content before the timer operation (1*j*-100). Likewise, instead of the operation of transmitting system information after configuring the barring factor to zero, the system information may be transmitted after configuring the same to the value before the timer started (1*j*-105).

FIG. 1K illustrates a case in which a timer starts and then expires before a reestablishment operation ends successfully. A terminal receiving a service from an IAB node that has failed, or the MT part 1*k*-1 of a downstream IAB node receiving a service from the IAB node that has failed, may remain connected to the IAB node 1*k*-5 that has failed, or may be camping while maintaining an idle or inactive state (1*k*-3). The MT part 1*k*-10 of the IAB node remains connected to the serving cell (1*k*-30). The serving cell may be the cell that IAB node 2 in FIG. 1H serves. The MT part of the IAB node may receive a configuration of a timer value from the serving cell through dedicated signaling in the connected state (1*k*-35), or may receive a configuration through system information (1*k*-25). A failure may occur to the MT part in the connected state (1*k*-40). Although a radio link failure is given as an example in this description, all examples of failure in an normal RRC process, such as a handover failure, a reconfiguration failure, and an integrity check failure, may be applied. If a failure occurs, the MT operates a predetermined timer (1*k*-45). In this process, failure indication signaling may exist between the MT part of the failed IAB node and the base station part (1*k*-90). If a failure occurs, the MT operates a timer and simultaneously performs a RRF connection reestablishment operation. The RRC reestablishment operation may successively include a cell selection (1*k*-50), a procedure (1*k*-55) of random access to the selected cell (1*k*-20), transmission of an RRC reestablishment request message to the target cell 1*k*-20 of the MT, reception of the RRC setup/reestablishment message, and transmission of an RRC setup/reestablishment complete message. If the timer expires (1*k*-75) while the MT part of the failed node and the target cell perform the reestablishment operation, the DU part of the failed node or the failed IAB node 1*k*-5 performs at least one of the following three operations. As RRC dedicated signaling, a message that RRC-releases respective terminals and downstream IAB nodes in connected states may be transmitted (1*k*-100). Alternatively, a mark of RRC release may be inserted into a system information block, a MIB, or a synchronization signal block (SSB) and then transmitted (1*k*-105). This may be a one-bit indicator in terms of a Boolean value. As another method, transmission of a reference signal used for radio link monitoring (RLM) may be stopped (1*k*-110). This methods eliminates basic existence of cells, and thus is referred to as IAB disabling. This reference signal may be a SSB used for RLM-RS and/or a SSB or a CSI-RS used for cell quality measurement regardless of the CIS-RS or RLM-RS. In addition, transmission of the system information may be stopped, or transmission of the DMRS may be stopped. If the method of option 1 or 2 is performed, the terminal that has been connected to or camping on the failed IAB node and the MT part of the downstream IAB node may transition to the idle mode. In the case of option 3, the terminal that has been connected to or camping on the failed IAB node and the MT part of the downstream IAB node may perform an RRC reestablishment procedure in the connected states. The methods of options 1, 2, and 3 may also be started if a failure occurs during the reestablishment process of the MT part of the failed IAB node before the timer expires. The failure that may occur during the reestablishment process may include the following cases: a predefined timer expires during a cell selection operation (for example, T311 expires); a cell selection succeeds, a random access preamble is transmitted to the target cell, and a RACH failure occurs while no RAR is received for a predefined time window; and an RRC reestablishment request is made, and a reestablishment message or a setup message then fails to be received from the target cell until a predefined timer expires, or the target cell becomes unsuitable before the defined timer expires (for example, T301 expires).

If the timer 1*k*-45 starts and then expires (1*k*-75), or if a failure occurs during the reestablishment process before the timer expires, the MT part of the failed IAB node transitions to the idle mode (1*k*-115).

If the timer has started and has not expired, the DU part of the failed IAB node connected to the MT, or the failed IAB node may not allow additional connection from a terminal, or may perform an operation of preventing a terminal in an inactive/idle mode from camping through cell (re)selection. If the timer start (1k-45), an indication may be transmitted to a master information block (MIB), which is transmitted to a SSB, to indicate that the cell was barred (1k-80). Or/and barring factors may be configured with regard to the access category of all terminals, the access barring factor value among the factors may be changed to zero with regard to all access categories and access identifies, and the changed system information may be transmitted. The failed IAB node continues the operations 1k-80 and 1k-85 until the timer expires before the reestablishment succeeds.

FIG. 1L is a diagram illustrating operations of a terminal, specifically the MT part of a failed IAB node. The terminal performs data transmission/reception with an upstream IAB node in a normal connected state (1l-5). In this case, the terminal may receive a value regarding a timer operating for IAB disabling from the serving cell (1l-10). A failure occurs to the terminal at a timepoint after D1 value is configured (1l-15). If a failure occurs, the timer starts first, the terminal performs an RRC connection reestablishment operation and informs the IAB DU part thereof or the IAB node of an IAB suspension operation (1l-20). If a failure occurs during the reestablishment operation, or if the timer expires (1l-25), the terminal causes the DU part or the IAB node to perform an IAB disabling operation (1l-30). If no failure occurs during the reestablishment operation, and if recovery succeeds before the timer expires, a normal data transmission/reception operation is performed with a new target cell (1l-5).

FIG. 1M is a diagram illustrating operations of a terminal or a downstream IAB node which is connected to a failed IAB node or to the DU part of the failed IAB node, or which is camping thereon. The term "terminal" will be used herein in a comprehensive manner. A terminal in a connected mode performs normal data transmission/reception with the serving cell, that is, the DU part of the IAB node, or a terminal in an idle/inactive mode is camping on the corresponding serving cell (1m-5). If a failure occurs to the MT part of the serving cell, that is, to the MT part of the IAB node, the MT causes IAB suspension. As a result, terminals in the previous connected mode cannot establish additional RRC connection, and terminals in the idle/inactive mode cannot perform cell selection/reselection for camping on the corresponding cell (1m-10). Thereafter, if the disabling timer expires on the MT part, or if RRC reestablishment that has been performed on the MT part fails in the middle, RRC release information is inserted into a dedicated message or system information through a cell performed by the DU part of the corresponding failed IAB node, and is delivered to a terminal or downstream IAB node in the coverage of the cell performed by the corresponding DU part. Alternatively, the DU part of the failed IAB node stops transmitting the RS for RLM of the cell performed thereby. After receiving the IAB node disabling operation, the connected terminal and the MT part of the IAB node transition to the idle mode in the case of option 1 or 2 or perform an RRC reestablishment operation in the case of option 3 (1m-30).

In addition to the MAC and RRC layer messages, a backhaul adaption protocol (BAP) layer may play a similar role.

If the MT announces RLF in the link with the parent IAB node, the MT may send a signal regarding the occurred RLF to the DU. After receiving the signal, the DU may transmit a RLF occurrence indication to the child IAB node thereof through BAP layer signaling. After receiving the RLF occurrence indication, the child IAB node may buffer UL data to the parent IAB node that transmitted the RLF occurrence indication, and may suspend data transmission/reception with the parent IAB node.

Likewise, if the MT performs a recovery operation and succeeds in the operation after a RLF occurs in the link with the parent IAB node, the MT may inform the DU of the recovery success. The DU may deliver a RLF recovery success indication, through BAP layer signaling, to nodes previously informed of RLF occurrence among child IAB nodes thereof, or to all child nodes. The child IAB nodes that received the RLF recovery indication may resume data transmission/reception if data transmission/reception with the parent IAB node to which the indication has previously been transmitted has been suspended.

If the MT performs a recovery operation and fails after a RLF occurs in the link with the parent IAB node, the MT may inform the DU of the recovery failure. The DU may deliver a recovery failed indication, through BAP layer signaling, to nodes previously informed of RLF occurrence among child IAB nodes thereof, or to all child nodes. If the child IAB nodes that received the indication have a link connected to another parent IAB node, the same may perform a patch switch to the corresponding link. If there is no other link, a recovery failure indication may be again delivered to child TAP nodes thereof through BAP layer signaling.

The content of a BAP layer control packet used for BAP layer signaling (or control information delivered to the BAP layer) may include at least one of RLF occurrence, RLF recovery success, the (transmission or DL) BAP identifier or (transmission, egress, or DL) BPA address of the MT or IAB node that has failed in RLF recovery, and (or) the (reception, ingress, or UL) BAP identifier or BAP address of the receiving child IAB node. In addition, the content may include indications corresponding to the RLF, recovery success, and recovery failure.

If the MT fails in the RLF recovery, the MT may deliver indications to child nodes through the BAP layer signaling, and the DU of the IAB node to which the MT belongs may power off, may send a message to terminals accessed thereto so as to perform RRC connection reestablishment, or may transmit a message requesting RRC release. The message may be an RRC dedicated message or a SIB, or may be a NAC CE. After receiving the message, the terminals may perform an RRC reestablishment operation or enter an idle mode.

If a child node has received the above three indications from the parent node in the existing MAC layer, the child node may inform the BAP layer thereof of RLF occurrence, recovery success, or failure. If the BAP has received a recovery failure indication, the BAP may delete the entry that goes through the failed IAB node from the routing table of the BAP layer for processing UL traffic held by the BAP.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

Terms used in the following description to identify access nodes, terms referring to network entities, terms referring to messages, terms referring to interfaces between network entities, and terms referring to various kinds of identification information are for convenience of description. Therefore, the disclosure is not limited to the terms described below, and other terms may also be used to refer to objects having the same technical meanings.

Hereinafter, for convenience of description, the disclosure will use terms and names defined in the 3$^{rd}$ generation partnership project long term evolution (3GPP LTE) standard. However, the disclosure is not limited to the above terms and names, and is equally applicable to systems following other standards.

Referring to FIG. 2A, the radio access network of the LTE system may include evolved Nodes B (hereinafter, referred to as ENBs, nodes B, or base stations) 2a-05, 2a-10, 2a-15, and 2a-20, a mobility management entity (MME) 2a-25, and a serving-gateway (S-GW) 2a-30, as illustrated. User equipment (hereinafter, referred to as UE or terminal) 2a-35 may access an external network through the ENBs 2a-05 to 2a-20 and the S-GW 2a-30.

In FIG. 2A, the ENBs 2a-05 to 2a-20 may correspond to existing nodes B of a UMTS system. The ENBs may be connected to the UE 2a-35 through a wireless channel, and may perform more complicated roles than existing nodes B. In the LTE system, it is possible to provide all user traffic, including real-time services such as voice over IP (VoIP) through an Internet protocol, through a shared channel. Therefore, there is a need for a device for aggregating state information such as the UE buffer state, the available transmission power state, and the channel state, and then scheduling the same, and the ENBs 2a-05 to 2a-20 may be in charge thereof. A single ENB may normally control multiple cells. For example, in order to implement a transmission rate of 100 Mbps, a LTE system may use an orthogonal frequency division multiplexing (OFDM) as a radio access technology in a bandwidth of 20 MHz, for example. It is also possible to apply an adaptive modulation & coding (AMC) scheme which determines the modulation scheme and the channel coding rate according to the terminal's channel state. The S-GW 2a-30 is a device configured to provide a data bearer, and may generate or remove the data bearer under the control of the MME 2a-25. The MMEs are devices that handle not only the terminal-related mobility management function, but also various control functions, and may be connected to multiple base stations.

FIG. 2B is a diagram illustrating the wireless protocol structure of an existing LTE system.

Referring to FIG. 2B, the wireless protocol of the LTE system may include packet data convergence protocols (PDCPs) 2b-05 and 2b-40, radio link controls (RLCs) 2b-10 and 2b-35, and medium access controls (MACs) 2b-15 and 2b-30 on the terminal side and on the ENB side, respectively. The PDCPs may be in charge of operations such as IP header compression/restoration. Major functions of the PDCPs may be summarized as follows:
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink.

The radio link controls (RLCs) 2b-10 and 2b-35 may perform operations such as reconfiguring a PDCP packet data unit (PDU) into an appropriate size and performing an ARQ operation and the like. Major functions of the RLCs may be summarized as follows:
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment.

The MACs 2b-15 and 2b-30 may be connected to multiple RLC layer devices configured in a single terminal, and may perform operations of multiplexing RLC PDUs to a MAC PDU and demultiplexing RLC PDUs from a MAC PDU. Major functions of the MACs may be summarized as follows:
  Mapping between logical channels and transport channels
  Multiplexing/demultiplexing of MAC SDUs belonging to one or different logical channels into/from transport blocks (TB) delivered to/from the physical layer on transport channel s
  Scheduling information reporting
  Error correction through HARQ
  Priority handling between logical channels of one UE
  Priority handling between UEs by means of dynamic scheduling
  MBMS service identification
  Transport format selection
  Padding.

The physical layers 2b-20 and 2b-25 may perform operations of channel-coding and modulating upper-layer data, generating an OFDM symbol therefrom, and transmitting the same through a wireless channel, or demodulating an OFDM symbol received through the wireless channel, channel-decoding the same, and delivering the same to the upper layer.

FIG. 2C is a diagram illustrating the structure of a new radio mobile communication system.

Referring to FIG. 2C, the radio access network of the new radio (hereinafter, referred to as NR or 2g) mobile communication system may include a new radio node B (hereinafter, referred to as NR gNB or NR base station) 2c-10 and a new radio core network (NR CN) 2c-05. New radio user equipment (NR UE or terminal) may access an external network through the NR gNB 2c-10 and the NR CN 2c-05.

In FIG. 2C, the NR gNB 2c-10 may corresponds to an evolved node B (eNB) of the existing LTE system. The NR gNB may be connected to the NR UE 2c-15 through a wireless channel, and may provide a superior service than in the case of the existing node B. In the NR mobile communication system, all user traffic may be provided through a shared channel. Therefore, there is a need for a device for aggregating state information such as the UE buffer state, the available transmission power state, and the channel state, and then scheduling the same, and the NR NB 2c-10 may be in charge thereof. A single NR gNB may control multiple cells. In the NR mobile communication system, a bandwidth equal to or larger than the current maximum bandwidth may be applied in order to implement super-fast data transmission compared with the current LTE. In addition, orthogonal frequency division multiplexing (OFDM) may be used as the radio access technology, and beamforming technology may be additionally combined therewith. It is also possible to apply an adaptive modulation & coding (AMC) scheme which determines the modulation scheme and the channel coding rate according to the terminal's channel state. The NR CN 2c-05 may perform functions such as mobility support, bearer configuration, and QoS configuration. The NR CN is a device that handles not only the terminal-related mobility management function, but also various control functions, and may be connected to multiple base stations. In addition, the NR mobile communication system may interwork with an existing LTE system, and the NR CN may be connected to the MME 2c-25 through a network interface. The MME may be connected to an eNB 2c-30 (existing base station).

FIG. 2D is a diagram illustrating the wireless protocol structure of a NR mobile communication system to which the disclosure is applicable.

Referring to FIG. 2D, the wireless protocol of the NR mobile communication system includes NR service data adaption protocols (SDAPs) 2d-01 and 2d-45, NR PDCPs 2d-05 and 2d-40, NR RLCs 2d-10 and 2d-35, and NR MACs 2d-15 and 2d-30 on the terminal side and on the NR base station side, respectively.

Major functions of the NR SDAPs 2d-01 and 2d-45 may include some of the following functions:
  Transfer of user plane data
  Mapping between a QoS flow and a DRB for both DL and UL
  Marking QoS flow ID in both DL and UL packets
  Reflective QoS flow to DRB mapping for the UL SDAP PDUs.

With regard to a SDAP layer device, the terminal may uses a radio resource control (RRC) message to receive a configuration regarding whether to use the header of the SDAP layer device or to use the function of the SDAP layer device with regard to each PDCP layer device, with regard to each bearer, or with regard to each logical channel. If the SDAP header is configured, the terminal may indicate, by using a one-bit indicator (NAS reflective QoS) reflective of the non-access stratum (NAS) quality of service (QoS) of the SDAP header and a one-bit indicator (AS reflective QoS) reflective of the access stratum (AS) QoS, such that the terminal can update or reconfigure mapping information regarding the data bearer and the QoS flow of the uplink and the downlink. The SDAP header may include QoS flow ID information indicating the QoS. The QoS information may be used as data processing priority for supporting an efficient service, scheduling information, or the like.

Major functions of the NR PDCPs 2d-05 and 2d-40 may include some of the following functions:
  Header compression and decompression: ROHC only
  Transfer of user data
  In-sequence delivery of upper layer PDUs
  Out-of-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink.

In the above description, the reordering function of the NR PDCP devices may refer to a function of reordering PDCP PDUs received from the lower layer, based on the PDCP sequence number (SN). The reordering function of the NR PDCP devices may include a function of delivering data to the upper layer in the realigned order, or may include a function of directly delivering the data without considering the order. The reordering function of the NR PDCP devices may include a function of recording PDCP PDUs lost as a result of reordering, a function of reporting the state of the lost PDCP PDUs to the transmitting side, and a function of requesting retransmission of the lost PDCP PDUs.

Major functions of the NR RLCs 2d-10 and 2d-35 may include some of the following functions:
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment.

In the above description, the in-sequence delivery function of the NR RLC devices may refer to a function of delivering RLC SDUs received from the lower layer to the upper layer in a sequence. If a single RLC SDU has been segmented into multiple RLC SDUs and then received, the in-sequence delivery function of the NR RLC devices may refer to a function of reassembling and delivering the same.

The in-sequence delivery function of the NR RLC devices may refer to a function of reordering received RLC PDUs with reference to the RLC sequence number (SN) or PDCP SN, a function of recording RLC PDUs lost as a result of reordering, a function of reporting the state of the lost PDCP PDUs to the transmitting side, and a function of requesting retransmission of the lost PDCP PDUs.

The in-sequence delivery function of the NR RLC devices may include, if there is a lost RLC SDU, a function of delivering only RLC SDUs that precede the lost RLC SDU to the upper layer in a sequence.

The in-sequence delivery function of the NR RLC devices may include, if there is a lost RLC SDU, but if a predetermined timer expires, a function of delivering all RLC SDUs received before the timer started to the upper layer in a sequence.

The in-sequence delivery function of the NR RLC devices may include, if there is a lost RLC SDU, but if a predetermined timer expires, a function of delivering all currently received RLC SDUs to the upper layer in a sequence.

The NR RLC devices may process RLC PDUs in the received order, regardless of the order of the sequence number (out-of-sequence delivery) and may deliver the same to the NR PDCP devices.

If segments are received, the NR RLC devices may receive segments stored in the buffer or segments to be received later, may reconfigure the same into a single complete RLC PDU, and then may deliver the same to the NR PDCP devices.

The NR RLC layers may not include the concatenation function, which may be performed by the NR MAC layers or replaced with the multiplexing function of the NR MAC layers.

In the above description, the out-of-sequence delivery function of the NR RLC devices may refer to a function of directly delivering RLC SDUs received from the lower layer to the upper layer regardless of the order. The out-of-sequence delivery function of the NR RLC devices may refer to, if a single RLC SDU has been segmented into multiple RLC SDUs and then received, a function of reassembling and delivering the same. The out-of-sequence delivery function of the NR RLC devices may include a function of storing the RLC SN or PDCP SN of received RLC PDUs and recording RLC PDUs lost as a result of reordering.

The NR MACs $2d$-15 and $2d$-30 may be connected to multiple NR RLC layer devices configured in a single terminal, and major functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding.

The NR PHY layers $2d$-20 and $2d$-25 may perform operations of channel-coding and modulating upper-layer data, generating an OFDM symbol therefrom, and transmitting the same through a wireless channel, or demodulating an OFDM symbol received through the wireless channel, channel-decoding the same, and delivering the same to the upper layer.

FIG. 2E is a block diagram illustrating the inner structure of a terminal to which the disclosure is applied.

Referring to the diagram, the terminal includes a radio frequency (RF) processing unit $2e$-10, a baseband processing unit $2e$-20, a storage unit $2e$-30, and a control unit $2e$-40.

The RF processing unit $2e$-10 performs functions for transmitting/receiving signals through a wireless channel, such as band conversion of signals and amplification thereof. That is, the RF processing unit $2e$-10 up-converts a baseband signal provided from the baseband processing unit $2e$-20 into a RF band signal, transmits the same through an antenna, and down-converts a RF band signal received through the antenna into a baseband signal. For example, the RF processing unit $2e$-10 may include a transmitting filter, a receiving filter, an amplifier, a mixer, an oscillator, a digital to analog convertor (DAC), an analog to digital convertor (ADC), and the like. Although only one antenna is illustrated in the diagram, the terminal may include multiple antennas. In addition, the RF processing unit $2e$-10 may include multiple RF chains. Moreover, the RF processing unit $2e$-10 may perform beamforming. For the sake of the beamforming, the RF processing unit $2e$-10 may adjust the phase and magnitude of respective signals transmitted/received through multiple antennas or antenna elements. In addition, the RF processing unit may perform MIMO, and may receive multiple layers when performing the MIMO operation.

The base band processing unit $2e$-20 performs a function for conversion between a baseband signal and a bit string according to the physical layer specification of the system. For example, during data transmission, the baseband processing unit $2e$-20 encodes and modulates a transmission bit string, thereby generating complex symbols. In addition, during data reception, the baseband processing unit $2e$-20 demodulates and decodes a baseband signal provided from the RF processing unit $2e$-10, thereby restoring a reception bit string. For example, when the orthogonal frequency division multiplexing (OFDM) scheme is followed, the baseband processing unit $2e$-20 encodes and modulates a transmission bit string during data transmission, thereby generating complex symbols, maps the complex symbols to subcarriers, and configures OFDM symbols through inverse fast Fourier transform (IFFT) operation and cyclic prefix (CP) insertion. In addition, during data reception, the baseband processing unit $2e$-20 divides a baseband signal received from the RF processing unit $2e$-10 with regard to each OFD symbol, restores signals mapped to subcarriers through fast Fourier transform (FFT), and restores the reception bit string through demodulation and decoding.

The baseband processing unit $2e$-20 and the RF processing unit $2e$-10 transmit and receive signals as described above. Accordingly, the baseband processing unit $2e$-20 and the RF processing unit $2e$-10 may be referred to as transmitting units, receiving units, transmitting/receiving units, or communication units. Moreover, at least one of the baseband processing unit $2e$-20 and the RF processing unit $2e$-10 may include multiple communication modules in order to support different multiple radio access technologies. In addition, at least one of the baseband processing unit $2e$-20 and the RF processing unit $2e$-10 may include different communication modules in order to process signals in different frequency bands. For example, the different radio access technologies may include a wireless LAN (for example, IEEE 802.11), a cellular network (for example, LTE), and the like. In addition, the different frequency bands may include a super-high frequency (SHF) (for example, 2.NRHz, NRhz) band and a millimeter wave (for example, 60 GHz) band.

The storage unit $2e$-30 stores data for operation of the terminal, such as a basic program, an application program, and configuration information. Particularly, the storage unit $2e$-30 may store information regarding a second access node that performs wireless communication by using a second radio access technology. In addition, the storage unit $2e$-30 provides the stored data at the request of the control unit $2e$-40.

The control unit $2e$-40 controls overall operations of the terminal. For example, the control unit $2e$-40 transmits/receives signals through the baseband processing unit $2e$-20 and the RF processing unit $2e$-10. In addition, the control unit $2e$-40 records and reads data in the storage unit $2e$-40. To this end, the control unit $2e$-40 may include at least one processor. For example, the control unit $2e$-40 may include a communication processor (CP) configured to perform control for communication and an application processor (AP) configured to control the upper layer, such as an application program.

FIG. 2F is a block diagram illustrating the configuration of a NR base station according to the disclosure.

As illustrated in the diagram, the base station includes a RF processing unit $2f$-10, a baseband processing unit $2f$-20, a backhaul communication unit $2f$-30, a storage unit $2f$-40, and a control unit $2f$-50.

The RF processing unit $2f$-10 performs functions for transmitting/receiving signals through a wireless channel, such as band conversion of signals and amplification thereof. That is, the RF processing unit $2f$-10 up-converts a baseband signal provided from the baseband processing unit $2f$-20 into a RF band signal, transmits the same through an antenna, and down-converts a RF band signal received through the antenna into a baseband signal. For example, the RF processing unit 2f-10 may include a transmitting filter, a receiving filter, an amplifier, a mixer, an oscillator, a DAC, an ADC, and the like. Although only one antenna is illustrated in the diagram, the first access node may include multiple antennas. In addition, the RF processing unit 2f-10 may include multiple RF chains. Moreover, the RF processing unit 2f-10 may perform beamforming. For the sake of the beamforming, the RF processing unit 2f-10 may adjust the phase and magnitude of respective signals transmitted/received through multiple antennas or antenna elements. The RF processing unit may perform a downward MIMO operation by transmitting at least one layer.

The base band processing unit 2f-20 performs a function for conversion between a baseband signal and a bit string according to the physical layer specification of the first radio access technology. For example, during data transmission, the baseband processing unit 2f-20 encodes and modulates a transmission bit string, thereby generating complex symbols. In addition, during data reception, the baseband processing unit 2f-20 demodulates and decodes a baseband signal provided from the RF processing unit 2f-10, thereby restoring a reception bit string. For example, when the OFDM scheme is followed, the baseband processing unit 2f-20 encodes and modulates a transmission bit string during data transmission, thereby generating complex symbols, maps the complex symbols to subcarriers, and configures OFDM symbols through IFFT operation and CP insertion. In addition, during data reception, the baseband processing unit 2f-20 divides a baseband signal received from the RF processing unit 2f-10 with regard to each OFD symbol, restores signals mapped to subcarriers through a FFT operation, and restores the reception bit string through demodulation and decoding. The baseband processing unit 2f-20 and the RF processing unit 2f-10 transmit and receive signals as described above. Accordingly, the baseband processing unit 2f-20 and the RF processing unit 2f-10 may be referred to as transmitting units, receiving units, transmitting/receiving units, communication units, or wireless communication units.

The backhaul communication unit 2f-30 provides an interface for communicating with other nodes inside the network. That is, the backhaul communication unit 2f-30 converts a bit string transmitted from the main base station to another node (for example, auxiliary base station or core network) into a physical signal, and converts a physical signal received from the other node into a bit string.

The storage unit 2f-40 stores data for operation of the main base station, such as a basic program, an application program, and configuration information. Particularly, the storage unit 2f-40 may store information regarding a bearer assigned to an accessed terminal, a measurement result reported from the accessed terminal, and the like. In addition, the storage unit 2f-40 may store information serving as a reference to determine whether to provide a terminal with multi-connection or to abort the same. Furthermore, the storage unit 2f-40 provides the stored data at the request of the control unit 2f-50.

The control unit 2f-50 controls overall operations of the main base station. For example, the control unit 2f-50 transmits/receives signals through the baseband processing unit 2f-20 and the RF processing unit 2f-10, or through the backhaul communication unit 2f-30. In addition, the control unit 2f-50 records and reads data in the storage unit 2f-40. To this end, the control unit 2f-50 may include at least one processor.

FIG. 2G is a diagram illustrating the configuration of an IAB system to which the disclosure is applied. Reference sign 2g-1 denotes an IAB donor node which performs wired communication with a core network 2g-5. The IAB donor node includes a centralized unit (CU) 2g-10 and multiple distributed units (DUs) 2g-15. The CU includes a control plane (CP) and a user plane (UP) therein. The CP exchanges control signals necessary for data transmission/reception and connection between the IAB donor node and DUs of downstream IAB nodes. The DU receive control signals from the CU and perform data transmission/reception with terminals. Other IAB nodes than the IAB donor node have at least one radio connection established with the CN, and each IAB node 2g-20 may have a terminal 2g-25 that receives a service therefrom and a downstream IAB node 2g-30 that receives a service therefrom. IAB nodes have a wireless backhaul link 2g-35 therebetween, and an IAB node and a terminal have a wireless access link 2g-40 therebetween. The wireless backhaul and the wireless access links may use the same frequency resources or separate frequency resources.

FIG. 2H illustrates an exemplary topology for describing the disclosure. It is assumed that end user UE1 2h-1 can transmit/receive data through a single data path. Alternatively, even if data can be transmitted/received by using multiple paths, the method according to the disclosure is applicable to a case in which a path switch through an RRC message needs to accompany between the multiple paths. It is assumed in this example that a data path is already configured through IAB 2, and a radio link failure has occurred between a mobile terminal (MT) of IAB node 2 and that of IAB node 1. In a normal case, if a RLF occurs, the terminal performs an RRC reestablishment operation. When performing this operation, the terminal performs a cell selection, re-accesses the selected cell, receives a connection reestablishment message form the core network, and transmits "complete" in response to the message. In this case, it is impossible to know how long time will be necessary for the cell selection, and, if a new cell is accessed, and if the corresponding cell has no terminal context, the same may go idle.

<Delivered Redirection Information>

Redirection information delivered to a terminal may be the following:

The physical cell ID (PCI) of cells provided by a downstream IAB node connected to the same IAB donor node as the IAB donor node connected currently or before connection failure, or provided by the DU part of the downstream IAB node; the NR-specific cell global identify (NCGI); the gNB ID; the DU ID; or a combination thereof. As lower-level information of the NCGI, PLMN ID information that the corresponding cell can support, ARFCN information regarding transmission of a synchronization signal and PBCH block (SSB) for a measurement purpose for the sake of the corresponding cell as frequency information, subcarrier spacing used when the SSB is transmitted, SSB measurement time configuration (SMTC) information, or the GSCN value may be considered.

As another embodiment, not only the information regarding cells provided by the downstream IAB node connected to the same IAB donor node or by the DU part of the downstream IAB node as mentioned above, but information regarding limited cells among the same may also be delivered. For example, it is possible to selectively deliver only information regarding cells belonging to IAB nodes geographically close to the serving DU of the terminal, to which redirection information is delivered, or to the serving IAB node. The above-mentioned cell-related information may also be delivered in this case.

In another embodiment, if each IAB node undergoes a node failure including a backhaul failure, and if downstream IAB nodes perform a recovery operation (or operation of performing reestablishment, searching for another cell, or performing re-access (including random access) to the identical or different cell), each IAB node may deliver information regarding an IAB node information that needs to be selected preferentially or information regarding a cell managed by the DU of the IAB node, to the downstream IAB nodes. This IAB node information or information regarding the cell managed by the DU may include the IAB node ID, the ID of the cell managed by the DU, or a combination of the two. The timepoint at which the information is delivered may be the timepoint at which a connection between the IAB node and the downstream IAB nodes is established, or any timepoint following the same. Alternately, after the IAB node undergoes a failure, the cell information may be delivered while being included in a failure indicator.

The cell to be selected preferentially may denote not only the cell of the downstream IAB node connected to the same IAB donor node, but also the cell of an IAB node on the topology that can replace the parent IAB node of the IAB node that has currently undergone a failure.

Alternatively, in contrast, if each IAB node undergoes a node failure including a backhaul failure, and if downstream IAB nodes perform a recovery operation, the IAB node may deliver information regarding an IAB node not to be selected or information regarding the cell managed by the DU of the IAB node, to the downstream IAB nodes. This information may be delivered by the IAB node to each DU through a F1 interface. Alternatively, respective IAB nodes may deliver the same to downstream IAB nodes through a relay.

If the IAB nodes receive this information, and if a node failure including a RLF occurs to the upstream IAB node, the IAB nodes select one from already given cells or preferentially select a given cell and then access the same. There may be no separate operation for cell selection.

In addition to the delivered cell ID information, offset information regarding signal intensity to be used when the corresponding cell is selected by a terminal may be delivered. The terminal may check cell suitability by applying the offset value. For reference, the check suitability satisfies cell selection criteria in the latter part of this document, and includes an operation of checking cell status, including cell barred, and cell reservation. In the case of cell selection, the existing criterion is as follows:

$$Srxlev > 0 \text{ AND } Squal > 0$$

wherein $$Srxlev = Q_{rxlevmeas} - (Q_{rxlevmin} + Q_{rxlevminoffset}) - P_{compensation} - Q_{offsettemp}$$

$$Squal = Q_{qualmeas} - (Q_{qualmin} + Q_{qualminoffset}) - Q_{offsettemp}$$

Definition of respective factors is as follows:

TABLE 1

| | Cell selection factors |
|---|---|
| Srxlev | Cell selection RX level value (dB) |
| Squal | Cell selection quality value (dB) |
| Qoffset$_{temp}$ | Offset temporarily applied to a cell as specified in [3] (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm). If the UE supports SUL frequency for this cell, Qrxlevmin is obtained from q-RxLevMin-sul, if present, in SIB1, else Qrxlevmin is obtained from q-RxLevMin in SIB1. |
| Q$_{qualmin}$ | Minimum required quality level in the cell (dB) |
| Q$_{rxlevminoffset}$ | Offset to the signalled Q$_{rxlevmin}$ taken into account in the Srxlev evaluation as a result of a periodic search for a higher priority PLMN while camped normally in a VPLMN [9] |
| Q$_{qualminoffset}$ | Offset to the signalled Q$_{qualmin}$ taken into account in the Squal evaluation as a result of a periodic search for a higher priority PLMN while camped normally in a VPLMN [9] |
| P$_{compensation}$ | If the UE supports the additionalPmax in the NS-PmaxList, if present, in SIB1:<br>max(P$_{EMAX1}$ − P$_{PowerClass}$, 0) − (min(P$_{EMAX2}$, P$_{PowerClass}$) − min(P$_{EMAX1}$, P$_{PowerClass}$)) (dB):<br>else:<br>max(P$_{EMAX1}$ − P$_{PowerClass}$, 0) (dB) |

The main objective is the same as follows:

$$Srxlev > 0 \text{ AND } Squal > 0$$

Instead, in the disclosure, IAB offset terms are added as follows:

$$Srxlev = Q_{rxlevmeas} - (Q_{rxlevmin} + Q_{rxlevminoffset}) - P_{compensation} - Q_{offsettemp} + Q_{rxlevIABcell}$$

$$Squal = Q_{qualmeas} - (Q_{qualmin} + Q_{qualminoffset}) - Q_{offsettemp} + Q_{qualIABcell}$$

wherein $Q_{rxlevIABcell}$ is a cell-specific factor provided by the IAB node, and is a value used when evaluating s criteria during a cell selection operation with regard to the RSRP value among cell signal intensity measurement values. In addition, $Q_{qualIABcell}$ is a cell-specific factor provided by the IAB node, and is a value used when evaluating s criteria during a cell selection operation with regard to the RSRQ value among cell signal intensity measurement values. The two values may be given in the unit of dB or dBm, and may be delivered through system information transmitted by the corresponding cell or through dedicated signaling. If the terminal accesses a specific IAB node, operates, performs a reestablishment operation, performs a cell selection, and preferentially selects cells belonging to redirection information previously received by the terminal, and if the cells broadcast the offset values as system information, then the terminal applies the values and performs suitability check. Considering the fact that the above-mentioned various factors are used for cell selection in a specific case, the following various suitability checks are possible.

In relation to the objective function,

If Srxlev>0 AND Squal>0 still needs to be satisfied, the following element equations may be applied:

$$Srxlev = Q_{rxlevmeas} - Q_{rxlevIABcell}$$

$$Squal = Q_{qualmeas} - Q_{qualIABcell} \quad \text{(equation 1)}$$

or $$Srxlev = Q_{rxlevmeas} - (Q_{rxlevmin}) + Q_{rxlevIABcell}$$

$$Squal = Q_{qualmeas} - (Q_{qualmin}) + Q_{qualIABcell} \quad \text{(equation 2)}$$

or $$Srxlev = Q_{rxlevmeas} - (Q_{rxlevmin} + Q_{rxlevminoffset}) + Q_{rxlevIABcell}$$

$$Squal = Q_{qualmeas} - (Q_{qualmin} + Q_{qualminoffset}) + Q_{qualIABcell} \quad \text{(equation 3)}$$

or $$Srxlev = Q_{rxlevmeas} - (Q_{rxlevmin} + Q_{rxlevminoffset}) - P_{compensation} + Q_{rxlevIABcell}$$

$$Squal = Q_{qualmeas} - (Q_{qualmin} + Q_{qualminoffset}) + Q_{qualIABcell} \quad \text{(equation 4)}$$

or $$Srxlev = Q_{rxlevmeas} - (Q_{rxlevmin} + Q_{rxlevminoffset}) - Q_{offsettemp} + Q_{rxlevIABcell}$$

$$Squal = Q_{qualmeas} - (Q_{qualmin} + Q_{qualminoffset}) - Q_{offsettemp} + Q_{qualIABcell} \quad \text{(equation 5)}$$

or $$Srxlev = Q_{rxlevmeas} - (Q_{rxlevmin} + Q_{rxlevminoffset}) - P_{compensation} - Q_{offsettemp} + Q_{rxlevIABcell}$$

$$Squal = Q_{qualmeas} - (Q_{qualmin} + Q_{qualminoffset}) - Q_{offsettemp} + Q_{qualIABcell} \quad \text{(equation 6)}$$

The above equations may be element equations of suitability check.

FIG. 2I is a diagram illustrating possible signaling through which the redirection information is delivered. The redirection information may be delivered from the DU of an upstream IAB node to a terminal through system information or dedicated signaling. The redirection information may become an RRC release message (opt 1) through dedicated signaling, or may become an RRC reconfiguration message (opt 2) otherwise. To this end, in the CU-CP, the redirection information may be delivered to the DU of the corresponding upstream IAB node through F1-AP or F1-C signaling. For example, a part or all of the redirection information may be delivered through a UE context modification request message.

FIG. 2J illustrates a case wherein, if redirection info is delivered to the upstream IAB node DU through F1-AP or F1-C signaling, information is bypassed between the DU and the MT of the IAB node.

An operation in a situation in which the redirection information is given will now be described.

FIG. 2K illustrates a redirection operation in a terminal failure situation.

A terminal 2k-5 is RRC-connected to a cell of an IAB node 2k-10 (2k-20). The terminal may receive redirection information mentioned in the previous section through system information 2k-25 or through an RRC dedicated message 2k-30. If a failure occurs while staying in the connected state, the terminal performs RRC reestablishment by the given redirection information (2k-35). The failure situation may correspond to a failure recognized at the RRC level, such as a radio link failure, a RLC failure, a reconfiguration failure, an integrity check failure, or a handover failure.

As a lower-level operation of the reestablishment operation, the terminal may initially perform a cell selection (2k-40). Existing operations for the cell selection are as follows: if stored information is used, and if a cell found by using carrier frequency information, cell information stored due to already given measurement control, or already detected cell information passes a suitability check, the cell is selected. It is assumed in the disclosure that the above-mentioned cell information for cell redirection has already been delivered through an RRC dedicated message or a SIB and/or MIB message, and the corresponding cell's information is stored in the terminal. Through this information, the terminal preferentially searches for a cell stored in redirection information already stored (2k-40), reads cell selection information of the SIB and/or MIB of the corresponding cell 2k-15 (2k-45), and performs a suitability check (2k-50). If the check is passed, the terminal performs synchronization with the corresponding cell (2k-60) and transmits an RRC connection reestablishment request (2k-60). The selected cell determines whether or not terminal context exists therein. If the terminal context exists, the cell transmits an RRC connection reestablishment message (2k-65). The terminal transmits an RRC connection reestablishment complete message in response thereto (2k-70).

In step 2k-45, $Q_{rxlevIABcell}$ $Q_{qualIABcell}$ information may not exist in the cell selection parameter received from the system information received from the found cell 2k-15. In this case, when performing a suitability check, the terminal may evaluate cell selection criteria by using an existing factor for cell selection given in Table 1, thereby conducting the suitability check. If $Q_{rxlevIABcell}$ $Q_{qualIABcell}$ information is included in the received system information in step 2k-45, the terminal performs a suitability check including that information. In this case, the above-mentioned equation 1 to equation 6 may be used.

If the dedicated message received in step 2k-30 includes, as redirection info, the above-mentioned cell information and information for cell selection criteria regarding respective cells, redundant factors among cell selection factors existing in the SIB and/or MIB 2k-45 read from the cell 2k-15 found for cell selection may be overwritten. In addition, if cell selection information not existing in the SIB and/or MIB 2k-45 exists in the dedicated message although the same is not redundant, the corresponding information is considered as being given and thus used when the terminal conducts a suitability check.

FIG. 2L illustrates a flow of operations of the terminal. In 2l-5, the terminal receives redirection information in a connected state. Thereafter, if various kinds of RRC failure situations occur, the terminal performs an RRC reestablishment operation. As the first lower-level operation constituting the RRC reestablishment operation, the terminal performs a cell selection. In this case, one is selected from cells configured in already received redirection information. In this operation, the terminal gives priority to cells always configured in the redirection information over cells that are not. The terminal reads the SIB and/or MIB of a cell selected in this manner, and performs a suitability check by using factors necessary for the suitability check. If $Q_{rxlevIABcell}$ $Q_{qualIABcell}$ information (offset value) exists, the information is used to perform the suitability check; if not, the suitability check is performed by a parameter that is not an existing one. If a cell is determined suitable as a result of the suitability check, the cell is selected, and if not suitable, another cell given in the redirection info is selected, and a suitability check is performed with regard to the cell.

FIG. 2M illustrates a case in which redirection information is delivered through an RRC release message. The terminal, which is initially in a connected state, is instructed by the serving cell to release, and the above-mentioned redirection information may be included in the release message. As this information, information regarding a cell having priority during re-access and offset information necessary when reselecting the corresponding cell may be given. After receiving the information, the terminal ignores priority information and ranking information given to frequencies, and determines the rank among cells existing in the redirection info according to the existing reselection scheme. That is, when performing reselection and selection operations, the terminal only considers the cells in redirection information, and applies the following rules for inter-frequency and inter-RAT cells:

If threshServingLowQ is broadcast in system information and more than 1 second has elapsed since the UE camped on the current serving cell, cell reselection to a cell on a higher priority NR frequency or inter-RAT frequency than the serving frequency shall be performed if:

A cell of a higher priority NR or EUTRAN RAT/frequency fulfils Squal>ThreshX, HighQ during a time interval TreselectionRAT Otherwise, cell reselection to a cell on a higher priority NR frequency or inter-RAT frequency than the serving frequency shall be performed if:

A cell of a higher priority NR/inter-RAT frequency fulfils Srxlev>ThreshX, HighP during a time interval TreselectionRAT; and More than 1 second has elapsed since the UE camped on the current serving cell.

Cell reselection to a cell on an equal priority NR frequency shall be based on ranking for intra-frequency cell reselection as defined in sub-clause 5.2.4.6.

If threshServingLowQ is broadcast in system information and more than 1 second has elapsed since the UE camped on the current serving cell, cell reselection to a cell on a lower priority NR frequency or inter-RAT frequency than the serving frequency shall be performed if:

The serving cell fulfils Squal<ThreshServing, LowQ and a cell of a lower priority NR or E-UTRAN RAT/frequency fulfils Squal>ThreshX, LowQ during a time interval TreselectionRAT.

Otherwise, cell reselection to a cell on a lower priority NR frequency or inter-RAT frequency than the serving frequency shall be performed if:

The serving cell fulfils Srxlev<ThreshServing, LowP and a cell of a lower priority RAT/frequency fulfils Srxlev>ThreshX, LowP during a time interval TreselectionRAT; and More than 1 second has elapsed since the UE camped on the current serving cell.

Cell reselection to a higher priority RAT/frequency shall take precedence over a lower priority RAT/frequency if multiple cells of different priorities fulfil the cell reselection criteria.

Related parameters are defined as follows:

threshServingLowQ: RSRQ minimum value required by the serving cell

ThreshServing,lowP: RSRP minimum value required by the serving cell

Thresh_x,highQ: RSRQ desired threshold value required from a target cell due for reselection to a high-priority frequency (the target cell needs to exceed this value)

Threshx,lowQ: RSRQ minimum threshold value required from a target cell due for reselection to a low-priority frequency (the target cell needs to exceed this value)

TreselectionRAT: minimum time for which the target cell of the upper-level or lower-level frequency needs to maintain the RSRQ/RSRP metric during cell reselection Thresh_x,highP: RSRP desired threshold value required from a target cell due for reselection to a high-priority frequency (the target cell needs to exceed this value)

ThreshX,lowP: RSRP minimum threshold value required from a target cell due for reselection to a low-priority frequency (the target cell needs to exceed this value)

In addition, in the case of intra-freq cells among the cells given in the redirection information, the following rule is applied:

As a criterion for reselection between cells within the same frequency, the terminal needs to calculate two values.

The cell-ranking criterion Rs for serving cell and Rn for neighboring cells is defined by:

$$Rs = Q\mathrm{meas},s + Q\mathrm{hyst}$$

$$Rn = Q\mathrm{meas},n - Q\mathrm{offset}$$

where:

Qmeas is a RSRP measurement quantity used in cell reselections. That is, Qmea,s is a RSRP measurement quantity of the serving cell, and Qmeas,n is a RSRP measurement quantity of a neighboring cell.

Qoffset For intra-frequency: Equals to Qoffsets,n, if Qoffsets,n is valid, otherwise this equals to zero.

For inter-frequency: Equals to Qoffsets,n plus Qoffsetfrequency, if Qoffsets,n is valid, otherwise this equals to Qoffsetfrequency.

The UE shall perform ranking of all cells that fulfil the cell selection criterion S, which is defined in 5.2.3.2.

The cells shall be ranked according to the R criteria specified above by deriving Qmeas,n and Qmeas,s and calculating the R values using averaged RSRP results.

If rangeToBestCell is not configured, the UE shall perform cell reselection to the cell ranked as the best cell. If this cell is found to be not-suitable, the UE shall behave according to subclause 5.2.4.4.

If rangeToBestCell is configured, then the UE shall perform cell reselection to the cell with the highest number of beams above the threshold (i.e. absThreshSS-Consolidation) among the cells whose R value is within rangeToBestCell of the R value of the cell ranked as the best cell. If there are multiple such cells, the UE shall perform cell reselection to the highest ranked cell among them.

In all cases, the UE shall reselect the new cell, only if the following conditions are met:

the new cell is better ranked than the serving cell during a time interval TreselectionRAT;

more than 1 second has elapsed since the UE camped on the current serving cell.

If one cell exists in the redirection info with reference to the currently camped cell, the corresponding cell is searched for, and a suitability check is performed by using the MIB or SIB information of the corresponding cell. If the suitability check is satisfied, the corresponding cell is reselected, and connection setup/resumption is performed. If the suitability check is not satisfied, another cell with the next rank, given in the redirection, is selected, and the above operation is performed repeatedly. If the suitability is not satisfied with regard to any cell existing in the redirection, the existing cell reselection operation is performed.

The invention claimed is:

1. A method performed by an integrated access and backhaul (IAB) node in an IAB system, the method comprising:
    detecting a radio link failure (RLF) for a backhaul link with a parent IAB node of the IAB node;
    performing a RLF recovery for the backhaul link; and
    transmitting, to a child IAB node of the IAB node, a BAP (backhaul adaptation protocol) Control PDU (protocol data unit) including an RLF indication for the backhaul link, in case that the RLF recovery fails,
    wherein a link in which the BAP Control PDU including the RLF indication for the backhaul link is received is considered as a link in which RLF has occurred in case that the RLF indication for the backhaul link is received by the child IAB node.

2. The method of claim 1, wherein the RLF is detected by the child IAB node based on receiving the RLF indication for the backhaul link.

3. The method of claim 1, wherein the BAP Control PDU is transmitted based on a BAP layer signal.

4. The method of claim 1, wherein the RLF recovery comprises radio resource control (RRC) reestablishment or RLF recovery.

5. A method performed by a child integrated access and backhaul (IAB) node in an IAB system, the method comprising:
    receiving, from an IAB node on a link, a BAP (backhaul adaptation protocol) Control PDU (protocol data unit) including a radio link failure (RLF) indication for a backhaul link between the IAB node and a parent IAB node of the IAB node, in case that a RLF recovery for the backhaul link fails; and
    identifying the link in which RLF has occurred in case that the RLF indication for the backhaul link is received by the child IAB node.

6. The method of claim 5, further comprising:
    detecting the RLF based on receiving the RLF indication for the backhaul link.

7. The method of claim 5, wherein the BAP Control PDU is transmitted based on a BAP layer signal, and
    wherein the RLF recovery comprises radio resource control (RRC) reestablishment or RLF recovery.

8. An integrated access and backhaul (IAB) node in an IAB system, the IAB node comprising:
    a transceiver, and
    a controller configured to:
        detect a radio link failure (RLF) for a backhaul link with a parent IAB node of the IAB node;
        perform a RLF recovery for the backhaul link; and
        transmit, to a child IAB node of the IAB node, a BAP (backhaul adaptation protocol) Control PDU (protocol data unit) including an RLF indication for the backhaul link, in case that the RLF recovery fails,
    wherein a link in which the BAP Control PDU including the RLF indication for the backhaul link is received is considered as a link in which RLF has occurred in case that the RLF indication for the backhaul link is received by the child IAB node.

9. The IAB node of claim 8, wherein the RLF is detected by the child IAB node based on receiving the RLF indication for the backhaul link.

10. The IAB node of claim 8, wherein the BAP Control PDU is transmitted based on a BAP layer signal.

11. The IAB node of claim 8, wherein the RLF recovery comprises radio resource control (RRC) reestablishment or RLF recovery.

12. A child integrated access and backhaul (IAB) node in an IAB system, the child IAB node comprising:
    a transceiver, and
    a controller configured to:
        receive, from an IAB node on a link, a BAP (backhaul adaptation protocol) Control PDU (protocol data unit) including a radio link failure (RLF) indication for a backhaul link between the IAB node and a parent IAB node of the IAB node, in case that a RLF recovery for the backhaul link fails; and
        identifying the link in which RLF has occurred in case that the RLF indication for the backhaul link is received by the child IAB node.

13. The child IAB node of claim 12, wherein the controller is further configured to detect the RLF based on receiving the RLF indication for the backhaul link.

14. The child IAB node of claim 12, wherein the BAP Control PDU is transmitted based on a BAP layer signal.

15. The child IAB node of claim 12, wherein the RLF recovery comprises radio resource control (RRC) reestablishment or RLF recovery.

* * * * *